United States Patent
Busch et al.

(10) Patent No.: US 12,333,600 B2
(45) Date of Patent: Jun. 17, 2025

(54) AUTOMATIC DATA SEGMENTATION SYSTEM

(71) Applicant: Experian Health, Inc., Franklin, TN (US)

(72) Inventors: Christopher G. Busch, Maple Grove, MN (US); Nathaniel W. Lutz, Apple Valley, MN (US); Zackary Dixon, Leander, TX (US)

(73) Assignee: Experian Health, Inc., Franklin, TN (US)

( * ) Notice: Subject to any disclaimer, the term of this patent is extended or adjusted under 35 U.S.C. 154(b) by 0 days.

(21) Appl. No.: 18/527,040

(22) Filed: Dec. 1, 2023

(65) Prior Publication Data

US 2024/0212041 A1 Jun. 27, 2024

Related U.S. Application Data

(63) Continuation of application No. 16/521,267, filed on Jul. 24, 2019, now abandoned.

(Continued)

(51) Int. Cl.
*G06Q 40/03* (2023.01)
*G06F 16/28* (2019.01)
*G06N 20/00* (2019.01)

(52) U.S. Cl.
CPC ........... *G06Q 40/03* (2023.01); *G06F 16/288* (2019.01); *G06N 20/00* (2019.01)

(58) Field of Classification Search
CPC ....... G06Q 40/02; G06N 20/00; G06F 16/288
See application file for complete search history.

(56) References Cited

U.S. PATENT DOCUMENTS

| 4,346,442 A | 8/1982 | Musmanno |
| 4,491,725 A | 1/1985 | Pritchard |

(Continued)

FOREIGN PATENT DOCUMENTS

| EP | 0 297 780 | 1/1989 |
| JP | 2003-216817 | 7/2003 |

(Continued)

OTHER PUBLICATIONS

"A Google Health update," Google Official Blog, Sep. 15, 2010 in 4 pages, http://googleblog.blogspot.com/2010/09/google-health-update.html.

(Continued)

*Primary Examiner* — Edward Chang
(74) *Attorney, Agent, or Firm* — Knobbe, Martens, Olson & Bear, LLP

(57) ABSTRACT

Aspects include a system and method of automatic data segmentation to optimize a client's collection efforts against individuals serviced by the client. At least accounts receivables data, historical payment data, and credit related data associated with an individual may be provided to a model as input data to predict a recovery value for the individual. The recovery value may be a weighted average of a unit yield and recovery rate. Based on the predicted recovery value and client-provided segmentation boundaries that define segments as a range of recovery values, the individual may be assigned to a segment. The segment may inform the client of a particular collection strategy for the individual to optimize collection efforts. Additionally, recovery values for the individuals serviced by the client may be provided to a comparison system and utilized to directly compare collection efforts across a plurality of clients nationally and/or demographically.

20 Claims, 10 Drawing Sheets

Related U.S. Application Data

(60) Provisional application No. 62/702,646, filed on Jul. 24, 2018.

(56) References Cited

U.S. PATENT DOCUMENTS

| | | |
|---|---|---|
| 4,616,854 A | 10/1986 | Landrum et al. |
| 4,692,394 A | 9/1987 | Drexler |
| D297,243 S | 8/1988 | Wells-Papanek et al. |
| 4,869,531 A | 9/1989 | Rees |
| 5,101,476 A | 3/1992 | Kukla |
| 5,301,105 A | 4/1994 | Cummings, Jr. |
| 5,359,509 A | 10/1994 | Little et al. |
| 5,381,487 A | 1/1995 | Shamos |
| 5,483,443 A | 1/1996 | Milstein et al. |
| 5,500,513 A | 3/1996 | Langhans et al. |
| 5,517,405 A | 5/1996 | McAndrew et al. |
| 5,557,514 A | 9/1996 | Seare et al. |
| 5,583,760 A | 12/1996 | Klesse |
| 5,644,778 A | 7/1997 | Burks et al. |
| 5,748,907 A | 5/1998 | Crane |
| 5,764,923 A | 6/1998 | Tallman et al. |
| 5,786,998 A | 7/1998 | Neeson et al. |
| 5,832,447 A | 11/1998 | Rieker et al. |
| 5,903,830 A | 5/1999 | Joao et al. |
| 5,903,881 A | 5/1999 | Schrader et al. |
| 5,915,242 A | 6/1999 | Tsujii |
| 5,920,871 A | 7/1999 | Macri et al. |
| 5,991,733 A | 11/1999 | Aleia et al. |
| 5,999,596 A | 12/1999 | Walker et al. |
| 6,003,007 A | 12/1999 | DiRienzo |
| 6,012,035 A | 1/2000 | Freeman, Jr. et al. |
| D420,993 S | 2/2000 | Decker |
| 6,021,943 A | 2/2000 | Chastain |
| 6,044,352 A | 3/2000 | Deavers |
| 6,073,104 A | 6/2000 | Field |
| 6,112,190 A | 8/2000 | Fletcher et al. |
| 6,128,602 A | 10/2000 | Northington et al. |
| 6,157,914 A | 12/2000 | Seto et al. |
| 6,163,770 A | 12/2000 | Gamble et al. |
| 6,199,115 B1 | 3/2001 | DiRienzo |
| 6,202,053 B1 | 3/2001 | Christiansen et al. |
| 6,208,973 B1 | 3/2001 | Boyer et al. |
| 6,233,566 B1 | 5/2001 | Levine et al. |
| 6,304,848 B1 | 10/2001 | Singer |
| 6,327,578 B1 | 12/2001 | Linehan |
| 6,338,093 B1 | 1/2002 | DiRienzo |
| 6,341,265 B1 | 1/2002 | Provost et al. |
| 6,343,271 B1 | 1/2002 | Peterson et al. |
| 6,343,310 B1 | 1/2002 | DiRienzo |
| D455,435 S | 4/2002 | Cassano et al. |
| 6,374,229 B1 | 4/2002 | Lowrey et al. |
| 6,422,462 B1 | 7/2002 | Cohen |
| 6,456,979 B1 | 9/2002 | Flagg |
| 6,480,956 B1 | 11/2002 | DiRienzo |
| 6,513,018 B1 | 1/2003 | Culhane |
| 6,587,830 B2 | 7/2003 | Singer |
| 6,757,898 B1 | 6/2004 | Ilsen |
| 6,826,536 B1 | 11/2004 | Forman |
| 6,904,570 B2 | 6/2005 | Foote et al. |
| 6,928,487 B2 | 8/2005 | Eggebraaten et al. |
| 6,968,348 B1 | 11/2005 | Carone et al. |
| 6,978,268 B2 | 12/2005 | Thomas et al. |
| 6,999,972 B2 | 2/2006 | Lusen et al. |
| 7,006,994 B1 | 2/2006 | Campbell et al. |
| 7,016,856 B1 | 3/2006 | Wiggins |
| 7,034,691 B1 | 4/2006 | Rapaport et al. |
| 7,039,593 B2 | 5/2006 | Sager |
| 7,054,434 B2 | 5/2006 | Rodenbusch et al. |
| 7,069,226 B1 | 6/2006 | Kleinfelter |
| 7,072,842 B2 | 7/2006 | Provost et al. |
| 7,158,629 B2 | 1/2007 | Rodenbusch et al. |
| 7,174,302 B2 | 2/2007 | Patricelli et al. |
| 7,178,020 B2 | 2/2007 | DiRienzo |
| 7,191,150 B1 | 3/2007 | Shao et al. |
| 7,197,468 B1 | 3/2007 | Patricelli et al. |
| 7,246,068 B2 | 7/2007 | Thomas, Jr. |
| 7,260,586 B1 | 8/2007 | Ward |
| 7,263,492 B1 | 8/2007 | Suresh et al. |
| D550,233 S | 9/2007 | Vigesaa |
| 7,305,359 B2 | 12/2007 | Bonnell |
| 7,318,059 B2 | 1/2008 | Thomas et al. |
| 7,333,937 B2 | 2/2008 | Baldwin, Jr. et al. |
| 7,346,768 B2 | 3/2008 | DiRienzo |
| 7,370,018 B2 | 5/2008 | Bryant, Jr. et al. |
| 7,370,349 B2 | 5/2008 | Holvey et al. |
| 7,380,707 B1 | 6/2008 | Fredman |
| 7,401,050 B2 | 7/2008 | O'Neill |
| 7,403,923 B2 | 7/2008 | Elliott et al. |
| 7,409,632 B1 | 8/2008 | DiRienzo |
| 7,426,475 B1 | 9/2008 | Tangellapally et al. |
| 7,464,040 B2 | 12/2008 | Joao |
| 7,467,401 B2 | 12/2008 | Cicchitto |
| 7,490,048 B2 | 2/2009 | Joao |
| 7,493,266 B2 | 2/2009 | Gupta |
| 7,519,553 B2 | 4/2009 | Abe et al. |
| 7,522,038 B2 | 4/2009 | Edwards et al. |
| D593,114 S | 5/2009 | Vakkalanka |
| 7,536,348 B2 | 5/2009 | Shao et al. |
| 7,546,262 B1 | 6/2009 | Ferguson et al. |
| 7,555,720 B2 | 6/2009 | O'Rourke |
| 7,580,831 B2 | 8/2009 | Haskell et al. |
| 7,590,932 B2 | 9/2009 | Britton et al. |
| D604,740 S | 11/2009 | Matheny et al. |
| 7,617,078 B2 | 11/2009 | Rao et al. |
| 7,617,116 B2 | 11/2009 | Amar et al. |
| 7,647,320 B2 | 1/2010 | Mok et al. |
| 7,664,660 B2 | 2/2010 | Korpman et al. |
| 7,668,738 B2 | 2/2010 | Wiggins |
| 7,685,003 B2 | 3/2010 | Hasan et al. |
| 7,689,441 B1 | 3/2010 | Craft |
| 7,689,506 B2 | 3/2010 | Fei et al. |
| 7,693,730 B2 | 4/2010 | Hasan et al. |
| 7,694,129 B2 | 4/2010 | DiRienzo |
| 7,698,153 B2 | 4/2010 | Wiggins |
| 7,720,691 B2 | 5/2010 | Hasan et al. |
| 7,720,700 B2 | 5/2010 | Balogh |
| 7,720,757 B2 | 5/2010 | Srinivasan et al. |
| 7,725,330 B2 | 5/2010 | Rao et al. |
| 7,739,132 B2 | 6/2010 | Denny, Jr. et al. |
| 7,747,453 B2 | 6/2010 | Ulrich et al. |
| 7,747,559 B2 | 6/2010 | Leitner et al. |
| 7,756,728 B2 | 7/2010 | Maughan et al. |
| 7,761,379 B2 | 7/2010 | Zoldi et al. |
| 7,765,148 B2 | 7/2010 | German et al. |
| D621,850 S | 8/2010 | Tarara et al. |
| D622,280 S | 8/2010 | Tarara |
| 7,769,604 B1 | 8/2010 | Lefco et al. |
| 7,778,846 B2 | 8/2010 | Suresh et al. |
| 7,778,850 B2 | 8/2010 | Wester |
| 7,788,040 B2 | 8/2010 | Haskell et al. |
| 7,788,111 B2 | 8/2010 | Haskell et al. |
| D624,089 S | 9/2010 | Dyakov et al. |
| 7,797,165 B1 | 9/2010 | Beery et al. |
| 7,797,172 B2 | 9/2010 | Fitzgerald et al. |
| 7,813,937 B1 | 10/2010 | Pathria et al. |
| 7,822,621 B1 | 10/2010 | Chappel |
| 7,860,786 B2 | 12/2010 | Blackburn et al. |
| 7,865,373 B2 | 1/2011 | Punzak et al. |
| 7,873,528 B2 | 1/2011 | Bregante et al. |
| 7,877,269 B2 | 1/2011 | Bauer et al. |
| 7,885,836 B2 | 2/2011 | Pendleton et al. |
| 7,890,420 B2 | 2/2011 | Haggerty et al. |
| 7,904,305 B2 | 3/2011 | Suringa |
| 7,904,306 B2 | 3/2011 | Johnson et al. |
| 7,904,317 B1 | 3/2011 | Lesswing et al. |
| 7,917,377 B2 | 3/2011 | Rao et al. |
| 7,917,378 B2 | 3/2011 | Fitzgerald et al. |
| D636,401 S | 4/2011 | Vance et al. |
| D636,779 S | 4/2011 | Boush et al. |
| 7,949,597 B2 | 5/2011 | Zadoorian et al. |
| D640,264 S | 6/2011 | Fujii et al. |
| 7,983,932 B2 | 7/2011 | Kane |
| 8,005,687 B1 | 8/2011 | Pederson et al. |
| 8,014,756 B1 | 9/2011 | Henderson |

(56) References Cited

U.S. PATENT DOCUMENTS

| | | |
|---|---|---|
| 8,036,918 B1 | 10/2011 | Pinsonneault |
| D648,342 S | 11/2011 | Pearson et al. |
| 8,060,376 B2 | 11/2011 | Horner |
| 8,060,424 B2 | 11/2011 | Kasower |
| 8,069,058 B2 | 11/2011 | Ambrose |
| 8,073,710 B2 | 12/2011 | Hasan et al. |
| 8,078,524 B2 | 12/2011 | Crawford et al. |
| 8,090,742 B2 | 1/2012 | Mok et al. |
| 8,117,045 B2 | 2/2012 | Lorsch |
| 8,117,646 B2 | 2/2012 | Lorsch |
| 8,121,855 B2 | 2/2012 | Lorsch |
| 8,122,061 B1 | 2/2012 | Guinness |
| D656,503 S | 3/2012 | Brierley et al. |
| 8,155,979 B2 | 4/2012 | DiRienzo |
| 8,166,562 B2 | 4/2012 | Holvey et al. |
| 8,175,901 B1 | 5/2012 | Lefco et al. |
| 8,180,654 B2 | 5/2012 | Berkman et al. |
| 8,184,408 B2 | 5/2012 | Murakami et al. |
| 8,185,408 B2 | 5/2012 | Baldwin, Jr. et al. |
| 8,185,414 B2 | 5/2012 | Law et al. |
| 8,204,762 B2 | 6/2012 | Wester |
| 8,214,232 B2 | 7/2012 | Tyler et al. |
| 8,219,415 B2 | 7/2012 | Tyler et al. |
| 8,229,760 B2 | 7/2012 | Hasan et al. |
| 8,229,770 B2 | 7/2012 | Bregante et al. |
| 8,234,209 B2 | 7/2012 | Zadoorian et al. |
| 8,244,556 B1 | 8/2012 | Ringold |
| 8,250,026 B2 | 8/2012 | Mok et al. |
| 8,260,635 B2 | 9/2012 | Hasan et al. |
| 8,286,085 B1 | 10/2012 | Denise |
| 8,301,466 B2 | 10/2012 | Lorsch |
| 8,306,829 B2 | 11/2012 | Starkey et al. |
| 8,321,239 B2 | 11/2012 | Hasan et al. |
| 8,321,240 B2 | 11/2012 | Lorsch |
| 8,321,243 B1 | 11/2012 | Harris, Sr. et al. |
| 8,326,656 B2 | 12/2012 | Beery et al. |
| 8,332,366 B2 | 12/2012 | Schumacher et al. |
| 8,335,672 B1 | 12/2012 | Ringold |
| 8,352,287 B2 | 1/2013 | Lorsch |
| 8,352,288 B2 | 1/2013 | Lorsch |
| 8,352,538 B2 | 1/2013 | Noonan et al. |
| 8,364,498 B2 | 1/2013 | Sohr et al. |
| 8,364,499 B2 | 1/2013 | Maughan et al. |
| 8,374,885 B2 | 2/2013 | Stibel et al. |
| 8,379,352 B1 | 2/2013 | Braganca et al. |
| 8,380,537 B2 | 2/2013 | Hasan et al. |
| 8,386,274 B1 | 2/2013 | Pinsonneault et al. |
| 8,392,209 B1 | 3/2013 | Bertha et al. |
| 8,392,214 B1 | 3/2013 | Pinsonneault et al. |
| 8,392,219 B1 | 3/2013 | Pinsonneault et al. |
| 8,392,223 B2 | 3/2013 | Hasan et al. |
| 8,407,066 B2 | 3/2013 | Gentry et al. |
| 8,412,542 B2 | 4/2013 | Mok et al. |
| 8,433,586 B2 | 4/2013 | Wester |
| 8,438,184 B1 | 5/2013 | Wang |
| 8,438,657 B2 | 5/2013 | Kaleja |
| 8,442,963 B2 | 5/2013 | Irish et al. |
| 8,443,428 B2 | 5/2013 | Martin et al. |
| 8,447,627 B1 | 5/2013 | Cruise |
| 8,452,611 B1 | 5/2013 | Johnson et al. |
| 8,463,816 B2 | 6/2013 | Skubacz et al. |
| 8,473,310 B2 | 6/2013 | Hasan et al. |
| D685,813 S | 7/2013 | Bork et al. |
| 8,489,415 B1 | 7/2013 | Ringold |
| 8,489,423 B2 | 7/2013 | Hasan et al. |
| 8,489,424 B2 | 7/2013 | Hasan et al. |
| 8,498,883 B2 | 7/2013 | Lorsch |
| D687,451 S | 8/2013 | Ghadge |
| 8,510,807 B1 | 8/2013 | Elazary et al. |
| 8,521,557 B1 | 8/2013 | Ringold et al. |
| 8,527,292 B1 | 9/2013 | Ozden |
| 8,577,849 B2 | 11/2013 | Yakout et al. |
| 8,583,684 B1 | 11/2013 | Kirmse |
| 8,620,725 B2 | 12/2013 | Neuweg et al. |
| 8,639,522 B2 | 1/2014 | Pathria et al. |
| 8,660,855 B2 | 2/2014 | Pourfallah et al. |
| 8,666,757 B2 | 3/2014 | Suresh et al. |
| 8,682,688 B1 | 3/2014 | Coluni et al. |
| 8,694,390 B2 | 4/2014 | Imrey et al. |
| 8,762,369 B2 | 6/2014 | Macho et al. |
| 8,768,826 B2 | 7/2014 | Imrey et al. |
| 8,775,291 B1 | 7/2014 | Mellman et al. |
| 8,781,850 B2 | 7/2014 | Bazzani et al. |
| D716,333 S | 10/2014 | Chotin et al. |
| 8,874,476 B1 | 10/2014 | Taylor, III et al. |
| D721,723 S | 1/2015 | Sureshkumar |
| 8,930,216 B1 | 1/2015 | Johnson et al. |
| 8,943,565 B2 | 1/2015 | Magee et al. |
| 8,965,848 B2 | 2/2015 | Caceres |
| D727,928 S | 4/2015 | Allison et al. |
| 9,002,883 B1 | 4/2015 | Kirmse |
| D728,589 S | 5/2015 | Tarara-Byyny et al. |
| D737,831 S | 9/2015 | Lee |
| D748,126 S | 1/2016 | Sarukkai et al. |
| 9,262,481 B1 | 2/2016 | Le et al. |
| D754,144 S | 4/2016 | Vazquez et al. |
| D754,675 S | 4/2016 | Vazquez et al. |
| D754,676 S | 4/2016 | Vazquez et al. |
| 9,324,111 B2 | 4/2016 | Long et al. |
| D757,070 S | 5/2016 | Dziuba |
| D764,506 S | 8/2016 | Rathke et al. |
| 9,436,704 B2 | 9/2016 | Gershon et al. |
| D769,263 S | 10/2016 | Jussekev et al. |
| D774,052 S | 12/2016 | Gedrich et al. |
| D774,058 S | 12/2016 | Dias et al. |
| 9,514,327 B2 | 12/2016 | Ford |
| 9,529,923 B1 | 12/2016 | Baird, III |
| D781,887 S | 3/2017 | Dziuba et al. |
| D782,526 S | 3/2017 | Rind et al. |
| 9,589,058 B2 | 3/2017 | Balduzzi et al. |
| 9,613,190 B2 | 4/2017 | Ford et al. |
| D790,586 S | 6/2017 | Gopalan et al. |
| D793,420 S | 8/2017 | Noack |
| D794,047 S | 8/2017 | Gandhi et al. |
| D795,274 S | 8/2017 | Rhodes et al. |
| 9,727,919 B2 | 8/2017 | Gregg et al. |
| D798,312 S | 9/2017 | Tsujimura et al. |
| 9,762,533 B2 | 9/2017 | Ren et al. |
| 9,762,553 B2 | 9/2017 | Ford et al. |
| 9,785,696 B1 | 10/2017 | Yakhnenko et al. |
| 9,830,464 B2 | 11/2017 | Busch |
| 9,847,985 B2 | 12/2017 | Ochs et al. |
| D808,986 S | 1/2018 | Dudey |
| 9,864,746 B2 | 1/2018 | Gilder et al. |
| D812,081 S | 3/2018 | Saneii |
| 9,928,108 B1 | 3/2018 | Wagner et al. |
| 9,946,699 B1 | 4/2018 | Dye et al. |
| 9,953,047 B2 | 4/2018 | Lambert et al. |
| D819,071 S | 5/2018 | Rathke et al. |
| 9,965,519 B2 | 5/2018 | Hattori et al. |
| 10,033,733 B2 | 7/2018 | Baltzer et al. |
| D831,049 S | 10/2018 | Agarwal et al. |
| 10,102,259 B2 | 10/2018 | Agrawal et al. |
| 10,102,598 B2 | 10/2018 | MacKenzie et al. |
| D833,458 S | 11/2018 | Blechschmidt et al. |
| D833,459 S | 11/2018 | Blechschmidt et al. |
| D833,460 S | 11/2018 | Blechschmidt et al. |
| 10,122,799 B2 | 11/2018 | Behunin |
| 10,185,836 B2 | 1/2019 | Busch |
| 10,187,399 B2 | 1/2019 | Katz |
| D841,675 S | 2/2019 | Hoffman et al. |
| 10,237,262 B2 | 3/2019 | Ochs et al. |
| 10,275,576 B2 | 4/2019 | Furst et al. |
| 10,275,828 B2 | 4/2019 | Reisz et al. |
| D854,030 S | 7/2019 | Dascola et al. |
| D854,560 S | 7/2019 | Field et al. |
| D854,561 S | 7/2019 | Field et al. |
| D854,566 S | 7/2019 | Hsueh et al. |
| 10,339,271 B2 | 7/2019 | Beaton et al. |
| 10,354,211 B1 | 7/2019 | Pilkington et al. |
| 10,362,135 B2 | 7/2019 | McNeese et al. |
| 10,366,351 B2 | 7/2019 | Whittier et al. |
| 10,380,320 B2 | 8/2019 | Farmer et al. |
| 10,387,615 B2 | 8/2019 | Derer |

(56) References Cited

U.S. PATENT DOCUMENTS

| | | |
|---|---|---|
| 10,402,480 B2 | 9/2019 | Aghaiipour |
| 10,402,539 B2 | 9/2019 | Johnson et al. |
| 10,410,305 B1 | 9/2019 | Pilkington et al. |
| 10,419,347 B2 | 9/2019 | Porteous et al. |
| 10,430,428 B2 | 10/2019 | Ott et al. |
| 10,462,004 B2 | 10/2019 | Hsiao et al. |
| D871,431 S | 12/2019 | Cullum et al. |
| 10,506,051 B2 | 12/2019 | Behunin |
| 10,510,046 B2 | 12/2019 | Whittier et al. |
| 10,546,098 B2 | 1/2020 | Derer |
| 10,614,495 B2 | 4/2020 | Busch et al. |
| 10,664,463 B2 | 5/2020 | Ananthakrishnan |
| D888,084 S | 6/2020 | Doti et al. |
| 10,685,401 B1 | 6/2020 | Hanson et al. |
| 10,701,057 B2 | 6/2020 | Ochs et al. |
| 10,733,546 B2 | 8/2020 | Pilkington et al. |
| 10,740,332 B2 | 8/2020 | Zhang et al. |
| 10,783,137 B2 | 9/2020 | Katz |
| 10,817,966 B2 | 10/2020 | Dennis et al. |
| 10,853,900 B2 | 12/2020 | Hua et al. |
| 10,891,268 B2 | 1/2021 | Dennis et al. |
| 10,902,002 B2 | 1/2021 | Johnson et al. |
| 11,080,110 B2 | 8/2021 | Pilkington et al. |
| 11,101,805 B2 | 8/2021 | McGrath |
| 11,102,311 B2 | 8/2021 | Kurth et al. |
| 11,194,829 B2 | 12/2021 | Dennis et al. |
| 11,327,975 B2 | 5/2022 | Rowe et al. |
| 11,334,822 B2 | 5/2022 | Long et al. |
| 11,380,435 B2 | 7/2022 | Hoffman et al. |
| 11,504,011 B1 | 11/2022 | Jain |
| 11,645,344 B2 | 5/2023 | McGrath et al. |
| 2001/0014868 A1 | 8/2001 | Herz et al. |
| 2002/0010594 A1 | 1/2002 | Levine |
| 2002/0062249 A1 | 5/2002 | Iannacci |
| 2002/0077869 A1 | 6/2002 | Doyle et al. |
| 2002/0099635 A1 | 7/2002 | Guiragosian |
| 2002/0103680 A1 | 8/2002 | Newman |
| 2002/0116245 A1 | 8/2002 | Hinkle et al. |
| 2002/0123946 A1 | 9/2002 | Haworth et al. |
| 2002/0138417 A1 | 9/2002 | Lawrence |
| 2002/0147617 A1 | 10/2002 | Schoenbaum et al. |
| 2002/0188467 A1 | 12/2002 | Eke |
| 2002/0198741 A1 | 12/2002 | Randazzo |
| 2002/0198796 A1 | 12/2002 | White et al. |
| 2003/0018496 A1 | 1/2003 | Hambright et al. |
| 2003/0028402 A1 | 2/2003 | Ulrich et al. |
| 2003/0036926 A1 | 2/2003 | Starkey et al. |
| 2003/0037054 A1 | 2/2003 | Dutta et al. |
| 2003/0041019 A1 | 2/2003 | Vagim, III et al. |
| 2003/0050795 A1 | 3/2003 | Baldwin, Jr. et al. |
| 2003/0063072 A1 | 4/2003 | Brandenberg et al. |
| 2003/0105648 A1 | 6/2003 | Schurenberg et al. |
| 2003/0120652 A1 | 6/2003 | Tifft |
| 2003/0219709 A1 | 11/2003 | Olenick et al. |
| 2003/0229507 A1 | 12/2003 | Perge |
| 2003/0233259 A1 | 12/2003 | Mistretta et al. |
| 2003/0233278 A1 | 12/2003 | Marshall |
| 2003/0236747 A1 | 12/2003 | Sager |
| 2004/0006489 A1 | 1/2004 | Bynon |
| 2004/0044604 A1 | 3/2004 | O'Neil |
| 2004/0073456 A1 | 4/2004 | Gottlieb et al. |
| 2004/0073457 A1 | 4/2004 | Kalies |
| 2004/0078228 A1 | 4/2004 | Fitzgerald et al. |
| 2004/0111292 A1 | 6/2004 | Hutchins |
| 2004/0117211 A1 | 6/2004 | Bonnell |
| 2004/0148203 A1 | 7/2004 | Whitaker et al. |
| 2004/0153336 A1 | 8/2004 | Virdee et al. |
| 2004/0172313 A1 | 9/2004 | Stein et al. |
| 2005/0015280 A1 | 1/2005 | Gabel et al. |
| 2005/0038670 A1 | 2/2005 | Takkar et al. |
| 2005/0038772 A1 | 2/2005 | Colrain |
| 2005/0044357 A1 | 2/2005 | Fano |
| 2005/0065816 A1 | 3/2005 | Limberg et al. |
| 2005/0086071 A1 | 4/2005 | Fox, Jr. et al. |
| 2005/0086072 A1 | 4/2005 | Fox, Jr. et al. |
| 2005/0091080 A1 | 4/2005 | Biats, Jr. |
| 2005/0091164 A1 | 4/2005 | Varble |
| 2005/0147947 A1 | 7/2005 | Cookson, Jr. et al. |
| 2005/0187948 A1 | 8/2005 | Monitzer et al. |
| 2005/0197954 A1 | 9/2005 | Maitland et al. |
| 2005/0209880 A1 | 9/2005 | Drelicharz et al. |
| 2005/0209885 A1 | 9/2005 | Lamb et al. |
| 2005/0209893 A1 | 9/2005 | Nahra et al. |
| 2005/0228692 A1 | 10/2005 | Hodgon |
| 2005/0234789 A1 | 10/2005 | Czyzewski et al. |
| 2005/0246200 A1 | 11/2005 | Thompson et al. |
| 2005/0251429 A1 | 11/2005 | Ammer et al. |
| 2005/0288964 A1 | 12/2005 | Lutzen et al. |
| 2006/0020360 A1 | 1/2006 | Wu |
| 2006/0026156 A1 | 2/2006 | Zuleba |
| 2006/0031301 A1 | 2/2006 | Herz et al. |
| 2006/0074991 A1 | 4/2006 | Lussier et al. |
| 2006/0080139 A1 | 4/2006 | Mainzer |
| 2006/0106653 A1 | 5/2006 | Lis |
| 2006/0136264 A1 | 6/2006 | Ealon |
| 2006/0149603 A1 | 7/2006 | Patterson et al. |
| 2006/0178915 A1 | 8/2006 | Chao |
| 2006/0184397 A1 | 8/2006 | Wester |
| 2006/0190334 A1 | 8/2006 | Smith |
| 2006/0212315 A1 | 9/2006 | Wiggins |
| 2006/0235743 A1 | 10/2006 | Long et al. |
| 2006/0247947 A1 | 11/2006 | Suringa |
| 2006/0247949 A1 | 11/2006 | Shorrosh |
| 2006/0247991 A1 | 11/2006 | Jin et al. |
| 2006/0282359 A1 | 12/2006 | Nobili et al. |
| 2006/0287949 A1 | 12/2006 | Silverman |
| 2006/0293923 A1 | 12/2006 | Farris |
| 2007/0005402 A1 | 1/2007 | Kennedy et al. |
| 2007/0005403 A1 | 1/2007 | Kennedy et al. |
| 2007/0011026 A1 | 1/2007 | Higgins et al. |
| 2007/0022141 A1 | 1/2007 | Singleton et al. |
| 2007/0043659 A1 | 2/2007 | Kass et al. |
| 2007/0043661 A1 | 2/2007 | Kass et al. |
| 2007/0050208 A1 | 3/2007 | Bardis et al. |
| 2007/0050219 A1 | 3/2007 | Sohr et al. |
| 2007/0061393 A1 | 3/2007 | Moore |
| 2007/0100943 A1 | 5/2007 | Brunswig et al. |
| 2007/0118410 A1 | 5/2007 | Nadai |
| 2007/0124235 A1 | 5/2007 | Chakraborty et al. |
| 2007/0168234 A1 | 7/2007 | Ruthowski et al. |
| 2007/0174122 A1 | 7/2007 | Howard et al. |
| 2007/0198336 A1 | 8/2007 | Thompson |
| 2007/0198407 A1 | 8/2007 | Winter |
| 2007/0203750 A1 | 8/2007 | Volcheck |
| 2007/0208640 A1 | 9/2007 | Banasiak et al. |
| 2007/0214005 A1 | 9/2007 | Kennedy |
| 2007/0233519 A1 | 10/2007 | Lorsch |
| 2007/0258626 A1 | 11/2007 | Reiner |
| 2007/0266037 A1 | 11/2007 | Terry et al. |
| 2007/0266439 A1 | 11/2007 | Kraft |
| 2007/0276750 A1 | 11/2007 | Stuart |
| 2007/0279187 A1 | 12/2007 | Hekmatpour et al. |
| 2007/0294126 A1 | 12/2007 | Maggio |
| 2007/0299697 A1 | 12/2007 | Friedlander et al. |
| 2007/0299699 A1 | 12/2007 | Policelli et al. |
| 2007/0299776 A1 | 12/2007 | Frustaci et al. |
| 2008/0005669 A1 | 1/2008 | Eilertsen et al. |
| 2008/0010096 A1 | 1/2008 | Patterson et al. |
| 2008/0033750 A1 | 2/2008 | Burriss et al. |
| 2008/0046803 A1 | 2/2008 | Beauchamp et al. |
| 2008/0059224 A1 | 3/2008 | Schechter |
| 2008/0091463 A1 | 4/2008 | Shakamuri |
| 2008/0109315 A1 | 5/2008 | Huang et al. |
| 2008/0120129 A1 | 5/2008 | Seubert et al. |
| 2008/0120133 A1 | 5/2008 | Krishnaswami et al. |
| 2008/0121033 A1 | 5/2008 | Molnar |
| 2008/0126335 A1 | 5/2008 | Gandhi et al. |
| 2008/0133325 A1 | 6/2008 | De et al. |
| 2008/0140599 A1 | 6/2008 | Pacha et al. |
| 2008/0183504 A1 | 7/2008 | Highley |
| 2008/0183693 A1 | 7/2008 | Arasu et al. |
| 2008/0189202 A1 | 8/2008 | Zadoorian et al. |
| 2008/0195600 A1 | 8/2008 | Deakter |
| 2008/0208631 A1 | 8/2008 | Morita et al. |

(56) References Cited

U.S. PATENT DOCUMENTS

| | | |
|---|---|---|
| 2008/0208633 A1 | 8/2008 | Navani |
| 2008/0208914 A1 | 8/2008 | Navani |
| 2008/0244008 A1 | 10/2008 | Wilkinson et al. |
| 2008/0270363 A1 | 10/2008 | Hunt et al. |
| 2008/0275737 A1 | 11/2008 | Gentry et al. |
| 2008/0288283 A1 | 11/2008 | Baldwin, Jr. et al. |
| 2008/0300893 A1 | 12/2008 | Mendoza et al. |
| 2009/0006439 A1 | 1/2009 | Joseph et al. |
| 2009/0019552 A1 | 1/2009 | McLaughlin et al. |
| 2009/0024517 A1 | 1/2009 | Crooks |
| 2009/0024623 A1 | 1/2009 | Broder et al. |
| 2009/0030727 A1 | 1/2009 | Revak et al. |
| 2009/0037323 A1 | 2/2009 | Feinstein et al. |
| 2009/0048877 A1 | 2/2009 | Binns et al. |
| 2009/0048897 A1 | 2/2009 | Parikshya et al. |
| 2009/0055222 A1 | 2/2009 | Lorsch |
| 2009/0063197 A1 | 3/2009 | Lisle |
| 2009/0094055 A1 | 4/2009 | Gage, Jr. et al. |
| 2009/0094064 A1 | 4/2009 | Tyler et al. |
| 2009/0106178 A1 | 4/2009 | Chu |
| 2009/0106242 A1 | 4/2009 | McGrew et al. |
| 2009/0138277 A1 | 5/2009 | Warren et al. |
| 2009/0144088 A1 | 6/2009 | Zubiller et al. |
| 2009/0144094 A1 | 6/2009 | Morey et al. |
| 2009/0157435 A1 | 6/2009 | Seib |
| 2009/0177480 A1 | 7/2009 | Chen et al. |
| 2009/0187432 A1 | 7/2009 | Scalet et al. |
| 2009/0248481 A1 | 10/2009 | Dick et al. |
| 2009/0254375 A1 | 10/2009 | Martinez et al. |
| 2009/0271220 A1 | 10/2009 | Radoccia et al. |
| 2009/0281827 A1 | 11/2009 | Pendleton et al. |
| 2009/0287837 A1 | 11/2009 | Feisher |
| 2009/0319294 A1 | 12/2009 | Phillips et al. |
| 2009/0326976 A1 | 12/2009 | Morris |
| 2010/0049695 A2 | 2/2010 | Morsa |
| 2010/0063907 A1 | 3/2010 | Savani et al. |
| 2010/0070296 A1 | 3/2010 | Massoumi et al. |
| 2010/0070307 A1 | 3/2010 | Sinvhal-Sharma |
| 2010/0082362 A1 | 4/2010 | Salsbury et al. |
| 2010/0142698 A1 | 6/2010 | Spottiswoode et al. |
| 2010/0175024 A1 | 7/2010 | Schumacher et al. |
| 2010/0179838 A1 | 7/2010 | Basant et al. |
| 2010/0183199 A1 | 7/2010 | Smith et al. |
| 2010/0211413 A1 | 8/2010 | Tholl et al. |
| 2010/0217622 A1 | 8/2010 | Brown et al. |
| 2010/0217837 A1 | 8/2010 | Ansari et al. |
| 2010/0229184 A1 | 9/2010 | Satou et al. |
| 2010/0257074 A1 | 10/2010 | Hendrickson |
| 2010/0257126 A1 | 10/2010 | Tolan et al. |
| 2010/0274582 A1 | 10/2010 | Beraja et al. |
| 2010/0274583 A1 | 10/2010 | Beraja et al. |
| 2010/0280843 A1 | 11/2010 | Beraja et al. |
| 2010/0293090 A1 | 11/2010 | Domenikos et al. |
| 2010/0305993 A1 | 12/2010 | Fisher |
| 2010/0318372 A1 | 12/2010 | Band et al. |
| 2010/0332252 A1 | 12/2010 | Beraja et al. |
| 2011/0002384 A1 | 1/2011 | Mallat et al. |
| 2011/0010189 A1 | 1/2011 | Dean et al. |
| 2011/0015946 A1 | 1/2011 | Buckowsky et al. |
| 2011/0071846 A1 | 3/2011 | Crystal et al. |
| 2011/0071854 A1 | 3/2011 | Medeiros et al. |
| 2011/0082794 A1 | 4/2011 | Blechman |
| 2011/0099025 A1 | 4/2011 | Blum |
| 2011/0099027 A1 | 4/2011 | Weathers |
| 2011/0106617 A1 | 5/2011 | Cooper |
| 2011/0112873 A1 | 5/2011 | Allen et al. |
| 2011/0126275 A1 | 5/2011 | Anderson et al. |
| 2011/0179011 A1 | 7/2011 | Cardno et al. |
| 2011/0247051 A1 | 10/2011 | Bulumulla et al. |
| 2011/0251855 A1 | 10/2011 | Lorsch |
| 2011/0257992 A1 | 10/2011 | Scantland et al. |
| 2012/0046965 A1 | 2/2012 | Ryan et al. |
| 2012/0059674 A1 | 3/2012 | Horner |
| 2012/0078663 A1 | 3/2012 | Lorsch |
| 2012/0101847 A1 | 4/2012 | Johnson et al. |
| 2012/0102101 A1 | 4/2012 | Wenig et al. |
| 2012/0116807 A1 | 5/2012 | Hane et al. |
| 2012/0123789 A1 | 5/2012 | Patel |
| 2012/0130724 A1 | 5/2012 | Flegel et al. |
| 2012/0130746 A1 | 5/2012 | Baker |
| 2012/0143637 A1 | 6/2012 | Paradis et al. |
| 2012/0191479 A1 | 7/2012 | Gupta et al. |
| 2012/0203572 A1 | 8/2012 | Christensen |
| 2012/0203798 A1 | 8/2012 | Gifford et al. |
| 2012/0215552 A1 | 8/2012 | Goldschmidt |
| 2012/0215768 A1 | 8/2012 | Zellweger |
| 2012/0226889 A1 | 9/2012 | Merriman et al. |
| 2012/0265553 A1 | 10/2012 | Baldwin, Jr. et al. |
| 2012/0290660 A1 | 11/2012 | Rao et al. |
| 2012/0290950 A1 | 11/2012 | Rapaport et al. |
| 2012/0302268 A1 | 11/2012 | Casto et al. |
| 2012/0303386 A1 | 11/2012 | Zavaleta et al. |
| 2012/0331567 A1 | 12/2012 | Shelton |
| 2013/0018671 A1 | 1/2013 | Hussam |
| 2013/0054274 A1 | 2/2013 | Katyal |
| 2013/0054570 A1 | 2/2013 | Gonzales et al. |
| 2013/0073449 A1 | 3/2013 | Voynow et al. |
| 2013/0080192 A1 | 3/2013 | Bucur et al. |
| 2013/0090945 A1 | 4/2013 | Horner |
| 2013/0096942 A1 | 4/2013 | Bowles et al. |
| 2013/0110704 A1 | 5/2013 | Padron et al. |
| 2013/0138458 A1 | 5/2013 | Lorsch |
| 2013/0138555 A1 | 5/2013 | Shishkov |
| 2013/0144645 A1 | 6/2013 | Bjorner et al. |
| 2013/0179194 A1 | 7/2013 | Lorsch |
| 2013/0179195 A1 | 7/2013 | Lorsch |
| 2013/0191163 A1 | 7/2013 | Lorsch |
| 2013/0231960 A1 | 9/2013 | Lorsch |
| 2013/0282394 A1 | 10/2013 | Baldwin et al. |
| 2013/0288647 A1 | 10/2013 | Turgeman |
| 2013/0339314 A1 | 12/2013 | Carpentier et al. |
| 2014/0012740 A1 | 1/2014 | Carson et al. |
| 2014/0012780 A1 | 1/2014 | Sanders |
| 2014/0039929 A1 | 2/2014 | Vdovjak et al. |
| 2014/0040274 A1 | 2/2014 | Aravamudan et al. |
| 2014/0095239 A1 | 4/2014 | Mansfield et al. |
| 2014/0095541 A1 | 4/2014 | Herwadkar et al. |
| 2014/0142964 A1 | 5/2014 | Lang et al. |
| 2014/0149135 A1 | 5/2014 | Boerger et al. |
| 2014/0149303 A1 | 5/2014 | Band et al. |
| 2014/0180826 A1 | 6/2014 | Boal |
| 2014/0189483 A1 | 7/2014 | Awan et al. |
| 2014/0189818 A1 | 7/2014 | Meyer |
| 2014/0222684 A1 | 8/2014 | Feisher |
| 2014/0236572 A1 | 8/2014 | Meshulam et al. |
| 2014/0244276 A1 | 8/2014 | Dyke et al. |
| 2014/0244309 A1 | 8/2014 | Francois |
| 2014/0245015 A1 | 8/2014 | Velmmoor et al. |
| 2014/0324474 A1 | 10/2014 | Kunz |
| 2014/0365242 A1 | 12/2014 | Neff |
| 2014/0372458 A1 | 12/2014 | Jurca |
| 2014/0379361 A1 | 12/2014 | Mahadkar et al. |
| 2014/0379374 A1 | 12/2014 | Vinals |
| 2015/0026153 A1 | 1/2015 | Gupta et al. |
| 2015/0113393 A1 | 4/2015 | Burgin et al. |
| 2015/0120725 A1 | 4/2015 | de Vries et al. |
| 2015/0127364 A1 | 5/2015 | Long et al. |
| 2015/0127397 A1* | 5/2015 | Madala ............ G06Q 10/06311 705/7.13 |
| 2015/0135300 A1 | 5/2015 | Ford |
| 2015/0154698 A1 | 6/2015 | Stibel et al. |
| 2015/0161357 A1 | 6/2015 | Small |
| 2015/0163206 A1 | 6/2015 | McCarthy et al. |
| 2015/0186403 A1 | 7/2015 | Srivastava et al. |
| 2015/0193749 A1 | 7/2015 | Ivanoff et al. |
| 2015/0286747 A1 | 10/2015 | Anastasakos et al. |
| 2015/0310184 A1 | 10/2015 | Yui |
| 2015/0310188 A1 | 10/2015 | Ford et al. |
| 2015/0324920 A1 | 11/2015 | Wilson et al. |
| 2015/0348188 A1 | 12/2015 | Chen |
| 2015/0356142 A1 | 12/2015 | Proux |
| 2015/0363449 A1 | 12/2015 | Lambert et al. |
| 2016/0011746 A1 | 1/2016 | Lategan |
| 2016/0034642 A1 | 2/2016 | Ehrhart et al. |

(56) References Cited

U.S. PATENT DOCUMENTS

| | | |
|---|---|---|
| 2016/0037197 A1 | 2/2016 | Kitts et al. |
| 2016/0041800 A1 | 2/2016 | Jacobs et al. |
| 2016/0055142 A1 | 2/2016 | Strassner |
| 2016/0062903 A1 | 3/2016 | Gao et al. |
| 2016/0086222 A1 | 3/2016 | Kurapati |
| 2016/0092641 A1 | 3/2016 | Delaney et al. |
| 2016/0104508 A1 | 4/2016 | Chee et al. |
| 2016/0110523 A1 | 4/2016 | Francois |
| 2016/0125149 A1 | 5/2016 | Abramowitz |
| 2016/0132605 A1 | 5/2016 | Jiang |
| 2016/0147844 A1 | 5/2016 | Adderly et al. |
| 2016/0147951 A1 | 5/2016 | Francois et al. |
| 2016/0171027 A1 | 6/2016 | Agrawal et al. |
| 2016/0203279 A1 | 7/2016 | Srinivas et al. |
| 2016/0231900 A1 | 8/2016 | Meaney et al. |
| 2016/0267115 A1 | 9/2016 | Pletcher et al. |
| 2016/0283520 A1 | 9/2016 | Yamaji et al. |
| 2016/0283548 A1 | 9/2016 | Han et al. |
| 2016/0335341 A1 | 11/2016 | Krauss |
| 2016/0342758 A1 | 11/2016 | Ivnoff |
| 2017/0004279 A1 | 1/2017 | Pingali et al. |
| 2017/0006008 A1 | 1/2017 | Moran et al. |
| 2017/0039242 A1 | 2/2017 | Milton et al. |
| 2017/0053002 A1 | 2/2017 | Bowman et al. |
| 2017/0091388 A1 | 3/2017 | Zolla et al. |
| 2017/0091861 A1 | 3/2017 | Bianchi et al. |
| 2017/0098284 A1 | 4/2017 | Schneider |
| 2017/0111372 A1 | 4/2017 | Jamaa |
| 2017/0116373 A1 | 4/2017 | Ginsburg et al. |
| 2017/0124526 A1 | 5/2017 | Sanderford et al. |
| 2017/0132234 A1 | 5/2017 | Mehta |
| 2017/0147650 A1 | 5/2017 | Hattori et al. |
| 2017/0169168 A1 | 6/2017 | Batchelor et al. |
| 2017/0235901 A1 | 8/2017 | Johnson et al. |
| 2017/0249651 A1 | 8/2017 | Pulitzer |
| 2017/0272816 A1 | 9/2017 | Olds |
| 2017/0277838 A1 | 9/2017 | Derer |
| 2017/0329468 A1 | 11/2017 | Schon et al. |
| 2018/0039705 A1 | 2/2018 | Eyal et al. |
| 2018/0102936 A1 | 4/2018 | Curtis |
| 2018/0130555 A1 | 5/2018 | Chronis |
| 2018/0165349 A1 | 6/2018 | Vaughan |
| 2018/0191867 A1 | 7/2018 | Siebel et al. |
| 2018/0285872 A1 | 10/2018 | Millhouse et al. |
| 2018/0285969 A1 | 10/2018 | Busch et al. |
| 2018/0293249 A1 | 10/2018 | Tabares |
| 2018/0358130 A1 | 12/2018 | Schmidt |
| 2019/0051389 A1 | 2/2019 | Meittunen et al. |
| 2019/0095991 A1 | 3/2019 | Swaminathan et al. |
| 2019/0206520 A1 | 7/2019 | Eteminan et al. |
| 2019/0236714 A1 | 8/2019 | Hoerle et al. |
| 2019/0267141 A1 | 8/2019 | Fillmore |
| 2020/0034926 A1 | 1/2020 | Busch et al. |
| 2020/0126137 A1 | 4/2020 | Pilkington et al. |
| 2020/0145447 A1 | 5/2020 | Coffey et al. |
| 2020/0403956 A1 | 12/2020 | Adamski et al. |
| 2021/0035679 A1 | 2/2021 | Pankoke et al. |
| 2021/0064681 A1 | 3/2021 | McGrath et al. |
| 2021/0142914 A1 | 5/2021 | Hua et al. |
| 2021/0304265 A1 | 9/2021 | Yedlarajaiah et al. |
| 2021/0334462 A1 | 10/2021 | Kukreja |
| 2022/0076813 A1 | 3/2022 | Green et al. |
| 2022/0253592 A1 | 8/2022 | Rao |
| 2023/0214455 A1 | 7/2023 | Menard et al. |
| 2023/0215563 A1 | 7/2023 | Chaudhuri |
| 2023/0307136 A1 | 9/2023 | Tsang et al. |
| 2024/0013926 A1 | 1/2024 | Hua et al. |
| 2024/0127305 A1 | 4/2024 | Pilkington et al. |

FOREIGN PATENT DOCUMENTS

| | | |
|---|---|---|
| JP | 2004-126793 | 4/2004 |
| WO | WO 03/048889 | 6/2003 |
| WO | WO 2007/022510 | 2/2007 |
| WO | WO 2008/133721 | 11/2008 |
| WO | WO 2022/006441 | 1/2022 |

OTHER PUBLICATIONS

Agreement Between Dallas Computer Services, dba DCS Information Systems and the Texas Department of Human Services, to Provide Data Brokering Services, Contract #324Z-8-05203 signed Jun. 15, 1998 and including corresponding documents in 38 pages. [Search America—Exhibit 1010].

Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.

Bhattacharyya, Suman, "Explainer: How Neural Networks are Changing Credit Scores", https://digiday.com/marketing/wtf-neuro-decision-making/, Feb. 27, 2017, pp. 3.

Butkus, Charles, "System Cuts Medicaid Processing to 11 Cents a Claim", ComputerWorld, May 21, 1975, pp. 51 and 53.

"Charity Care Policy and Procedure", Report to the Community for the Year 2002, John T. Mather Memorial Hospital, Port Jefferson, NY, Mar. 2003, pp. 30-33 (6 pages total).

Corepoint Health, "The Continuity of Care Document—Changing the Landscape of Healthcare Information Exchange," Jan. 2009, pp. 9.

Compliance Data Systems, Inc. T-PASS Catalogue Profile, Sep. 8, 1994, available at http://www.compliancedata.com/catalogue.html.

Curriculum Vitae of Kenneth A. Zeger dated Jan. 8, 2013 in 20 pages.

Dé, Andy, "Will mHealth Apps and Devices Empower ePatients for Wellness and Disease Management? A Case Study," Jan. 10, 2011 in 6 pages, http://www.healthsciencestrategy.com/2011/04/will-mhealth-apps-and-devices-empower-epatients-for-wellness-and-disease-management-a-case-study-2/.

Dushimimana et al., "Use of Machine Learning Techniques to Create a Credit Score Model for Airtime Loans", Journal of Risk and Financial Management, Aug. 13, 2020, pp. 11.

Ellis et al., "Health Care Demand Elasticities by Type of Service", Journal of Health Economics, Jul. 29, 2017, vol. 55, pp. 232-243.

"Enterprise Technology Management Architecture", Texas Department of Human Services, Version 1.0, Aug. 31, 1999, pp. 22.

"Experian Helps Verify the Identity of Patients and Provide Secure Enrollment to Healthcare Portals by Integrating with Major Electronic Medical Records Platform," http://press.experian.com/United-States/Press-Release/experian-helps-verify-the-identity-of-patients-and-provide-secure-enrollment-to-healthcare.aspx?&p=1, Dec. 19, 2013, pp. 2.

"Factual Data Corp. Completes First Interface with Automated Underwriting System for Subprime Lenders", PR Newswire, Loveland, CO, Jan. 17, 2000.

Frohlich, Robert M., Jr., "Credit Scoring in a Hospital Setting", University of North Florida Thesis, Paper 97, Apr. 1997, pp. 82.

Glenn, Brandon, "Multi-provider patient portals get big boost with ONC ruling", Feb. 25, 2013, http://medicaleconomics.modernmedicine.com/medical-economics/news/user-defined-tags/meaningful-use/multi-provider-patient-portals-get-big-boost in 2 pages.

Healow.com, Various screenshots from page titled "Health and Online Wellness," https://healow.com/apps/jsp/webview/index.jsp printed Aug. 19, 2013 in 4 pages.

Healthspek.com, "How Good Are We?" http://healthspek.com/how-good-are-we/ printed Jan. 21, 2014 in 2 pages.

"Healthspek Users Can Now Import Their Doctors' Records into Their Personal Health Record," PRWeb, Nashville, TN, Jan. 14, 2014, pp. 1 http://www.prweb.com/releases/2014/01/prweb11485346.htm.

HealthVault, "Share Health Information," https://account.healthvault.com/sharerecord.aspx, printed Feb. 20, 2013 in 2 pages.

HealthVault, "What Can you do with HealthVault?" https://www.healthvault.com/us/en/overview,http://www.eweek.com/mobile/diversinet-launches-mobihealth-wallet-for-patient-data-sharing/, printed Feb. 20, 2013 in 2 pages.

(56) References Cited

OTHER PUBLICATIONS

"HelpWorks Family of Products Offers Solutions for Providers of Social Services", Software Announcement, Letter No. 297-476, Nov. 11, 1997, http://www.www-304.ibm.com/jct01003c/cgi-bin/common/ssi/ssialias?infotype=an&subtype=ca&htmlfid=897/ENUS297-476&appname=xldata&language=enus.

"HelpWorks: One-Stop Screening for the Benefits Your Clients Need", Peter Martin Associates, Inc. website, HelpWorks description, Jul. 11, 2000, http://web.archive.org/web/20000711013829/http://www.petermartin.com/Products/HelpWorks/hw_info02.html.

Horowitz, Brian T., "Diversinet Launches MobiHealth Wallet for Patient Data Sharing," eWeek, Dec. 4, 2012, http://www.eweek.com/mobile/diversinet-launches-mobihealth-wallet-for-patient-data-sharing/.

igihealth.com, "Orbit® PHR: Personal Health Record (PHR)," http://www.igihealth.com/consumers/orbit_phr.html, printed Jan. 21, 2014 in 2 pages.

"Implementation Advance Planning Document", Implementation Advance Planning Document, TIERS, Texas Department of Human Services, Eric M. Bost, Commissioner, May 2000, pp. 128.

Income and Eligibility Verification System (IEVS), Medi-Cal Eligibility Procedures Manual, Apr. 2000, pp. 164.

InsightsOne.com, "Healthcare," http://insightsone.com/healthcare-predictive-analytics/ printed Mar. 6, 2014 in 5 pages.

Jafari et al., "Expert Pruning Based on Genetic Algorithm in Regression Problems", ACIIDS 2012: Intelligent Information and Database Systems , 2012, pp. 79-88.

Jones, Sandra, "Small Software Firm Aiming for Internet", ChicagoBusiness.com, Mar. 13, 2000.

Krompass et al., "Managing Long-Running Queries", Conference: EDBT 2009, 12th International Conference on Extending Database Technology, Saint Petersburg, Russia, Mar. 24-26, 2009, pp. 132-143.

Liu et al., "Price and Income Elasticity of the Demand for Health Insurance and Health Care Services: A Critical Review of the Literature", Final Report, Mathemetica Policy Research, Inc., Contract No. 233-02-0086, MPR Reference No. 6203-042, Mar. 24, 2006, pp. 98.

"More Than a Pretty Face—How Intacct Dashboards Keep Your FQHC Key Metrics Front and Center", Mar. 1, 2016, posted at xanegy.com, [site visited Sep. 19, 2018]. http://xanegy.com/more-than-a-pretty-face-how-intacct-dashboards-keep-you-r-fqhc-key-metrics-front-and-center, pp. 2.

Mowll, Charles, "Setting a Credit Policy for Patient Accounts", Healthcare Financial Management, Jan. 1989, pp. 3.

Mowll, Charles, "Knowing How and When to Grant Credit Healthcare Organizations", Healthcare Financial Management, Feb. 1989, pp. 4.

Network Sciences Website, Community Health and Social Services Information System (CHASSIS) and Medicaider software by Network Sciences, LLC, on sale and/or in public use in or around 2000, as archived Aug. 28, 2008 in 1 page, https://web.archive.org/web/20080828164040/http://www.netsci.net/index.asp.

*Newsom v. Vanderbilt University et al.*, Opinion, 453 F.Supp. 401 (1978), Jun. 1, 1978, pp. 24.

"Parse", Definition from PC Magazine Encyclopedia, http://www/pcmag.com/encyclopedia_term_0,2542,t=parse&i=48862,00.asp as downloaded Mar. 5, 2012.

"Patient Schedule Demo Schedule" Jan. 2015, posted at ezdatamunch.com, [site visited Sep. 19, 2018]. https://ezdatamunch.com/wp-content/uploads/2015/01 /Patient-Schedule-Demo_-Schedule.png, pp. 1.

"Patients May be Frauds", The Victoria Advocate, Victoria, Texas, 138th Year—No. 194, p. 10A, Nov. 17, 1983.

PayingForSeniorCare.com, Pharmaceutical Patient Assistance Programs: Lowering the Cost of Medications, http://payingforseniorcare.com/patient-assistance-programs, Apr. 14, 2009, pp. 6.

PC411, Inc. "Reverse Searching Now Available on PC411," http://web.archive.org/web/19961103061843/http://www.pc411.com/PR_Revrs.html Apr. 9, 1996 in 2 pages.

"Peter Martin Releases HelpWorks Web Edition", Business Wire, Chicago, Sep. 28, 1999.

"Response Automated Decision Systems", responsecorp.com, Inc., Press Release, Ft. Lauderdale, FL, Jun. 22, 2000, http://web.archive.org/web/20010420061717/http://www.responsecorp.com/news.html.

Ringel et al., "The Elasticity of Demand for Health Care: A Review of the Literature and Its Application to the Military Health System", National Defense Research Institute, RAND Health, 2005, pp. 68.

Sear, Alan M., Ph.D., "An Expert System for Determining Medicaid Eligibility", Journal of Medical Systems, Oct. 1988, vol. 12, Issue 5, pp. 275-283.

*Search America, Inc. v. TransUnion Intelligence LLC*, Declaration of Kenneth Zeger in re: U.S. Pat. No. 7,333,937, Signed Jul. 24, 2013, pp. 9.

*Search America, Inc. v. TransUnion Intelligence LLC*, Decision, Case No. CBM2013-00038, U.S. Pat. No. 7,333,937, Feb. 7, 2014, pp. 24.

*Search America, Inc. v. TransUnion Intelligence LLC*, Declaration of Kenneth Zeger in re: U.S. Pat. No. 8,185,408, Signed Jul. 29, 2013, pp. 9.

*Search America, Inc. v. TransUnion Intelligence LLC*, Patent Owner Transunion Intelligence, LLC's Preliminary Response, Case No. CBM2013-00037, U.S. Pat. No. 7,333,937, Nov. 11, 2013, pp. 28.

*Search America, Inc. v. TransUnion Intelligence LLC*, Patent Owner Transunion Intelligence, LLC's Preliminary Response, Case No. CBM2013-00038, U.S. Pat. No. 8,185,408, Nov. 11, 2013, pp. 26.

*Search America, Inc. v. TransUnion Intelligence LLC*, Decision, Case No. CBM2013-00038, U.S. Pat. No. 8,185,408, Feb. 7, 2014, pp. 22.

*Search America, Inc. v. TransUnion Intelligence LLC*, Petition for Covered Business Method Patent Review Under 35 U.S.C. §§ 321 and Section 18 of the Leahy-Smith America Invents Act, U.S. Pat. No. 8,185,408, Jul. 29, 2013, pp. 84.

*Search America, Inc. v. TransUnion Intelligence LLC*, Petition for Covered Business Method Patent Review Under 35 U.S.C. §§ 321 and Section 18 of the Leahy-Smith America Invents Act, Case No. U.S. Pat. No. 7,333,937, Jul. 29, 2013, pp. 88.

*Search America, Inc. v. TransUnion Intelligence LLC*, Scheduling Order, Case No. CBM2013-00037, U.S. Pat. No. 7,333,937, Feb. 7, 2014, pp. 7.

*Search America, Inc. v. TransUnion Intelligence LLC*, Scheduling Order, Case No. CBM2013-00038, U.S. Pat. No. 8,185,408, Feb. 7, 2014, pp. 6.

"StarNet Financial, Inc. Acquires Proprietary Rights to Sub-Prime Underwriting System Through Strategic Alliance With TRAkkER Corporation", PR Newswire, Dallas, TX, Sep. 13, 1999.

Talburt et al., "Entity Information Life Cycle for Big Data: Master Data Management and Information Integration", Elsevier, 2015, 1st Ed, pp. 255.

Technical Architecture Framework, TIERS, May 8, 2000, pp. 67.

Tennant, Don, "How a Health Insurance Provider Uses Big Data to Predict Patient Needs," http://www.itbusinessedge.com/blogs/from-under-the-rug/how-a-health-insurance-provider-uses-big-data-to-predict-patient-needs.html, printed Mar. 6, 2014 in 2 pages.

Texas Comptroller of Public Accounts, Texas Performance Review, "Against the Grain: vol. 2," 1993, as printed Dec. 14, 2012 in 7 pages, from http://www.window.texas.gov/tpr/atg/atg/atgtoc.html.

Texas Comptroller of Public Accounts, Texas Performance Review, "Gaining Ground: vol. 2," 1994, as printed Dec. 14, 2012 in 4 pages, from http://www.window.texas.gov/tpr/tprgg/v2home.html.

Texas Department of Human Services, Revision Notice, Revision 99-1, Effective: Jan. 1, 1999, dated Dec. 11, 1998, pp. 11.

Texas Department of Human Services, Revision Notice, Revision 99-3, Effective: Jul. 1, 1999, dated May 28, 1999, pp. 11.

Texas Department of Human Services, Revision Notice, Revision 99-6, Effective: Oct. 1, 1999, dated Sep. 3, 1999, pp. 20.

Texas Department of Human Services, Revision Notice, Revision 00-3, Effective: Apr. 1, 2000, dated Mar. 3, 2000, pp. 17.

Texas Department of Human Services, OIG, 3000—Case Development, Jan. 1999, pp. 3.

(56) References Cited

OTHER PUBLICATIONS

Texas Department of Human Services, System Specifications, Section 3.2, Current System Architecture and Functional Specifications, NOA Assembled, pp. 21, as last modified Jul. 4, 2000.
Texas Department of Human Services, System Specifications, Section 3.3, Current System Architecture and Functional Specifications, GWS Assembled, pp. 752, as last modified Jul. 4, 2000.
Texas Department of Human Services, System Specifications, Section 3.3, Current System Architecture and Functional Specifications, GWS Assembled, pp. 754, as last modified Jul. 4, 2000.
Texas Department of Human Services, System Specifications, Section 3.3.1, TESS System, pp. 47, as last modified Jul. 4, 2000.
Texas Department of Human Services, System Specifications, Section 3.4, Current System Architecture and Functional Specifications, LTCMED Assembled, pp. 372, as last modified Jul. 4, 2000.
Texas Department of Human Services, System Specifications, Section 3.5, Current System Architecture and Functional Specifications, SAVERR FS Assembled, pp. 141, as last modified Jul. 4, 2000.
Texas Department of Human Services, System Specifications, Section 3.6, SAVERR TANF Assembled, pp. 219., as last modified Jul. 4, 2000.
Texas Department of Human Services, System Specifications, Section 3.7, Current System Architecture and Functional Specifications, SAVERR INTER/MED, pp. 838, as last modified Jul. 5, 2000.
Texas Department of Human Services, System Specifications, Section 3.8, Current System Architecture and Functional Specifications, pp. 172, as last modified Jul. 4, 2000.
"Third Party Assistance Software System (T-PASS)", Compliance Data Systems, Inc. website, T-PASS Information Page, Oct. 1, 1998, available at http://web.archive.org/web/20010308232545/http://compliancedata.com/tpass.html#Profile.
"TIERS Procurement Information," Texas Department of Human Services, as captured May 26, 2000 http://web.archive.org/web/20000526131749/http://www.dhs.state.tx.us/programs/TIERS/procurement.html in 3 pages.
TRAkkER Corporation website, trakkercorp.com, TRAkkER Software Description, May 26, 2000, available at http://web.archive.org/web/20000526234204/http://trakkercorp.com/page4.html.

*TransUnion Intelligence LLC* v. *Search America, Inc.*, Videotape Deposition of James Sunyar, Nov. 12, 2012, Case No. 0:11-CV-01075-EJS-FLN, pp. 128.
*TransUnion Intelligence LLC* v. *Search America, Inc.*, Oral and Videotape Deposition of Bobby Keith Graves, Oct. 26, 2012, Case No. 0:11-CV-01075-PJS-FLN, pp. 181.
*TransUnion Intelligence LLC* v. *Search America, Inc.*, Oral and Videotape Deposition of Kerby Spruiell, May 13, 2013, Case No. 0:11-CV-01075, pp. 257.
*TransUnion Intelligence LLC* v. *Search America, Inc.*, Videotape Deposition of Jodi Halpine, Oct. 16, 2012, Case No. 0:11-CV-01075-EJS-FLN, pp. 176.
*TransUnion Intelligence LLC* v. *Search America, Inc.*, Jury Trial Demand, Non-Confidential Redacted Version, Case No. 0:11-CV-01075-EJS-FLN, Nov. 16, 2012, pp. 42.
*TransUnion Intelligence LLC* v. *Search America, Inc.*, Jury Trial Demand, Case No. 0:11-cv-01075-PJS-FLN, Nov. 13, 2012, pp. 18.
*United States of America* v. *Patricia Lahaie Mahaney*, Government's Response to the Standing Discovery Order, Case:0:03-cr-60022-JIC, Entered into docket Jun. 17, 2003, pp. 16.
Varpa et al., "Genetic Algorithm Based Approach in Attribute Weighting for a Medical Data Set", Hindawi Publishing Corporation, Journal of Computational Medicine, Article ID 526801, 2014, pp. 11.
Vest et al., "Determinants of Preventable Readmissions in the United States: A Systematic Review", Implementation Science, 2010, vol. 5, No. 88, pp. 28.
Washington Automated Client Eligibility System (ACES), 1996, pp. 13.
Zhou et al., "Ensembling Neural Networks: Many Could be Better Than All", Artificial Intelligence, 2002, vol. 137, pp. 239-263.
Choudhury et al., "Evaluating Patient Readmission Risk: A Predictive Analytics Approach", American Journal of Engineering and Applied Sciences, Published Dec. 6, 2018, vol. 11, No. 4, pp. 1320-1331.
Mohanty et al., "A Multi-Modal Machine Learning Approach Towards Predicting Patient Readmission", 2020 IEEE International Conference on Bioinformatics and Biomedicine (BIBM), 2020, pp. 2027-2035.
Xiao et al., "Readmission Prediction Via Deep Contextual Embedding of Clinical Concepts", PLOS One, Published Apr. 9, 2018, pp. 15.

* cited by examiner

AUTOMATIC DATA SEGMENTATION SYSTEM

CROSS REFERENCE TO RELATED APPLICATIONS

This application claims the benefit of U.S. patent application Ser. No. 16/521,267, filed Jul. 24, 2019, titled "AUTOMATIC DATA SEGMENTATION SYSTEM," and U.S. Provisional Application No. 62/702,646, filed Jul. 24, 2018, titled "Auto-Segmenter for Collections Optimization," which are incorporated herein by reference in their entirety.

BACKGROUND

Service-related expenses for providers, particularly in the healthcare industry, are rising every year. To provide these services to individuals at a competitive rate and avoid passing along the rising costs (e.g., in a form of higher insurance deductibles), service providers often strive to increase collection efforts. For example, the service providers may work to develop strategies for collecting balances owed by individuals in view of the limited resources of the service providers to ultimately maximize returns.

However, predicting whether or not an individual is going to pay and how much they will pay is dependent on a large number of variables, particularly in the healthcare context where insurance is also involved. Due to complexity created by the large number of variables, accurate and timely predictions may be difficult to obtain using conventional techniques. Moreover, due to the highly specific nature of collections strategies from service provider to service provider, collection efforts cannot be directly compared across service providers.

BRIEF SUMMARY

A system, method and computer readable storage device for automatic data segmentation are described herein. An example automatic data segmentation system may provide a service provider, hereinafter referred to as a client, an easily consumable segment assignment for an individual owing a balance, where the segment assignment informs the collection strategy to be used for the individual to optimize collections efforts. The segment assignment may be based on a predicted recovery value for the individual and client-provided segmentation boundaries defining a range of recovery values for each segment. The recovery value may be predicted by processing at least accounts receivable data, payment history data, and credit related data of the individual using a client-specific, hyper-dimensional model trained with historical data of individuals serviced by the client.

Additionally, by utilizing recovery values for individuals, direct comparisons of collection efforts may be made across clients nationally and/or demographically, among other examples. Clients may use these comparisons to determine adjustments or improvements that can be made to their collection strategies for particular segments, for example, which may further aid in optimizing collections efforts.

In one example aspect, automatic data segmentation may be provided as a service to health care clients, where the data segmentation system may be communicatively coupled to various systems of the healthcare clients, such as health information systems, to facilitate communication of information between the systems. In another example aspect, automatic data segmentation may be provided as a service to other service providers that are required to collect payments from individuals after rendering services to the individuals, among other examples.

This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present invention.

DETAILED DESCRIPTION

Figure 1:
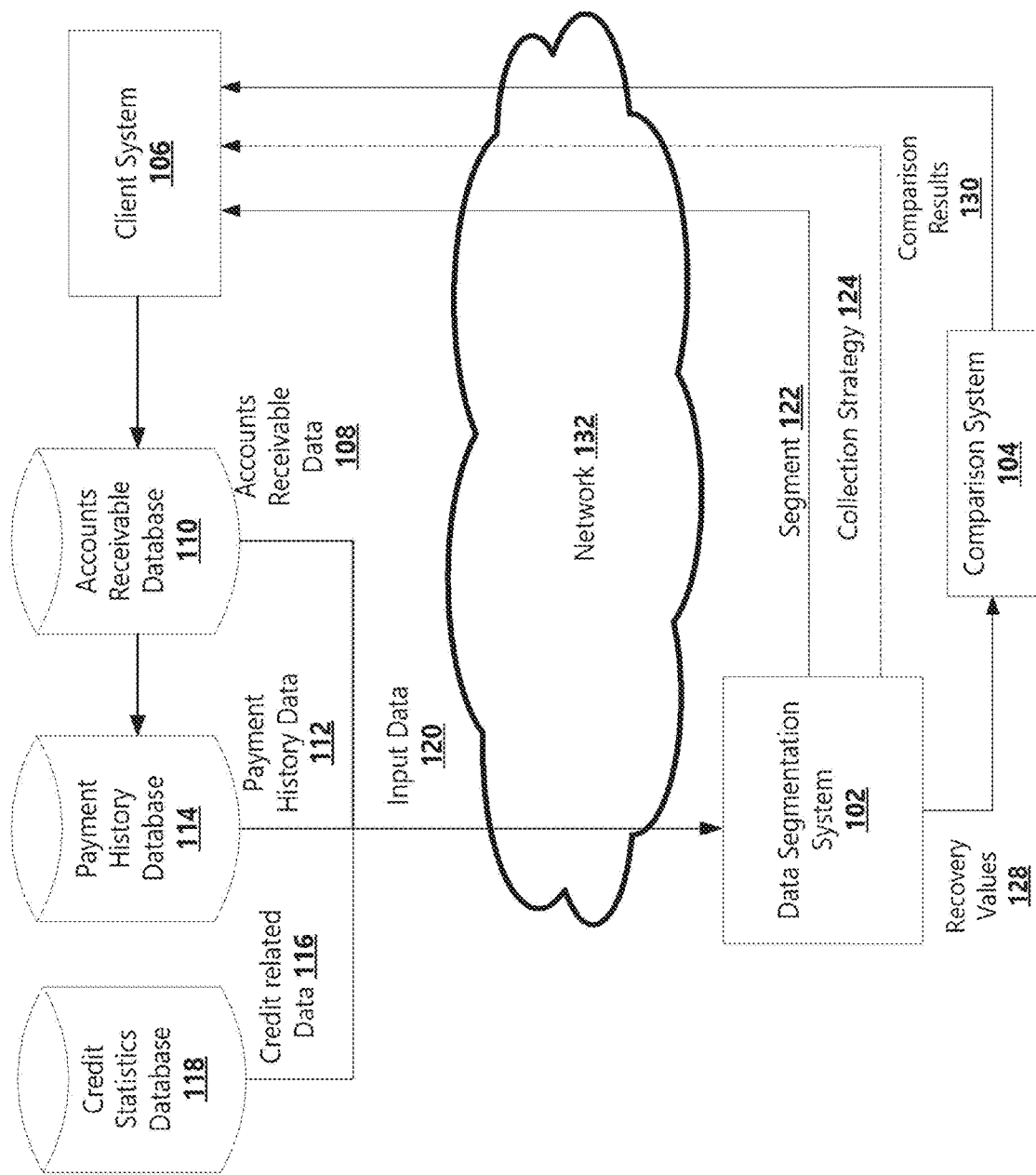
FIG. 1 is a block diagram of an example environment in which systems of the present disclosure can be implemented.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications can be made to the elements illustrated in the drawings, and the methods described herein can be modified by substituting, reordering, subtracting, and/or adding operations to the disclosed methods. Accordingly, the following detailed description does not limit the present disclosure, but instead, the proper scope of the present disclosure is defined by the appended claims. The following detailed description is, therefore, not to be taken in a limiting sense.

FIG. 1 is a block diagram of an example environment 100 in which systems of the present disclosure can be implemented. Example systems may include one or more of a data segmentation system 102 and a comparison system 104. In some examples, the data segmentation system 102 and the comparison system 104 may be sub-systems integrated in a single system. In other embodiments, the data segmentation system 102 and the comparison system 104 may be separate systems communicatively coupled to one another over a network 132. Additionally, the data segmentation system 102 and the comparison system 104 may be communicatively coupled with a system associated with a client, hereinafter referred to as client system 106, over the network 132. In example aspects, the client may be a healthcare service provider, such as a hospital, a diagnostic center, or a doctor's office, among other similar providers, and the client system 106 may be a health information system (HIS) or other similar system of the healthcare service provider.

The client system 106 may be a data source comprising information about individuals serviced by the client, including accounts receivable data 108, among other information. For example, when an individual receives services from the client, the client system 106 may create profiles for the clients and add invoices for the services to the client profiles, where the generated invoices may comprise accounts receivable data 108. The accounts receivable data 108 for each individual may include a total cost for the service(s) rendered, a cost responsibility of a guarantor if any (e.g., cost to be paid by insurance), a cost responsibility of the individual, an amount currently owed by the individual (e.g., a balance), an amount of payments made toward the cost, and other similar information. In example aspects, the client system 106 periodically provides the accounts receivable data 108 to the data segmentation system 102. For example, the client system 106 may provide accounts receivable data 108 every quarter of a year. The time period for providing the accounts receivable data 108 may be dynamically configurable by the data segmentation system 102 or the client.

The accounts receivable data 108 may be stored in an accounts receivable database 110. In some aspects, before being stored in the accounts receivable database 110, the accounts receivable data 108 may be processed to comply with a format of the accounts receivable database 110. The accounts receivable data 108 for an individual may be one type of data received as input data 120 for processing at the data segmentation system 102.

Payment history data 112 for the individual may be another type of data received as input data 120 for processing at the data segmentation system 102. In example aspects, payment history data 112 may be created from the accounts receivable data 108 for the respective individual and stored in the payment history database 114. In some examples, the payment history data 112 may be created by the data segmentation system 102. In other examples, the payment history data 112 may be created by the client system 106. The payment history data 112 may include invoices created for the individual over a predetermined time period, payments received from the individual for the created invoices, a time gap between the creation of the invoices and receipt of the payments, unpaid invoices, and delays associated with the unpaid invoices, among other similar information. The payment history data 112 may reveal whether the individual has ever paid the client, if there are patterns of the individual being in debt, etc.

In addition to the accounts receivable data 108 and the payment history data 112, credit related data 116 of the individual may be a further type of data received as input data 120 for processing at the data segmentation system 102. The credit related data 116 may be received from a credit statistics database 118, and include credit scores or credit report data. The credit data may obtained from a third party data source such as a credit rating entity or a credit bureau and stored in the credit statistics database 118. In some aspects, the credit score may be a healthcare-specific credit score. Additionally, other attributes including a service type (e.g., an emergency visit, an inpatient visit, or an outpatient visit) may be received as input data 120 for processing at the data segmentation system 102.

In some aspects, one or more of the accounts receivable database 110, the payment history database 114, and the credit statistics database 118 may be databases associated with the client system 106. In other aspects, one or more of the accounts receivable database 110, the payment history database 114, and the credit statistics database 118 may be databases associated with the data segmentation system 102. In further aspects, one or more of the accounts receivable database 110, the payment history database 114, and the credit statistics database 118 may be databases associated with a third party service, such as an online storage service, communicatively coupled to the data segmentation system 102 and the client system 106 over the network 132.

Once the input data 120 for the individual is received at the data segmentation system 102, the input data 120 may be processed using a model, and a segment 122 for the individual may be provided as output. For example, as described in detail in FIG. 2, a recovery value may be predicted for the individual based on the input data 120 using the model. The predicted recovery value may be a weighted average of a predicted unit yield and a predicted recovery rate determined from the modeling of the input data 120. The predicted unit yield may be a total monetary amount predicted to be received from the individual and the predicted recovery rate may be the percentage of the total amount that the individual is predicted to pay (e.g., a ratio of the monetary amount expected to be received to a total cost responsibility of the individual).

The segment 122 provided as output may be an easily consumable value (e.g., segment 1, 2, 3, 4, 5 or segment A, B, C, D, E) that informs a collection strategy for individuals falling within the segment in order to optimize collection efforts. The segment 122 may be determined based on the predicted recovery value and segment boundary definitions provided by the client system 106. For example, the boundary definitions define a range of recovery values for each segment. Therefore, the segment 122 determined may be the segment 122 comprising the range of recovery values in which the predicted recovery value falls. In some aspects, the client system 106 may determine the segment boundary definitions to provide based on resources of the client (e.g., a number of staff, hours, and other resources that may be dedicated to collection efforts). For example, if the client has adequate staff to work 10% of all the clients, the segmentation may be allocated accordingly.

The segment 122 for the individual may be provided to the client system 106. In some examples, the segment 122 may be provided along with the amount owed by the individual in a flat file. The client system 106 may determine a corresponding collection strategy 124 based on the segment 122 assigned to the individual. The collection strategies may vary in timing (e.g., a day/time of day or a frequency at which to contact the client) and a level of interaction (e.g., phone, email, letter, no communication). To provide an example, one segment may be defined by a range of recovery values indicating individuals falling within the segment are not likely to pay at all, or if so only a minimal amount. Therefore, to avoid wasting any time or resources on sending letters to and/or calling that individual, the collection strategy for the individual may be to write off the unpaid costs and/or get a charitable organization involved to help with the payment. To provide another example, another segment may be defined by a range of recovery values indicating individuals falling within the other segment are likely to pay but have a low balance (e.g., because they are insured and the insurance provider is paying for a large portion of the total cost). Accordingly, the collection strategy for the individual may be to write to the individual or call the individual at least once to prompt payment because the individual is likely to pay, but not to waste too many resources by repetitively contacting the individual as the amount that will be collected is low.

Optionally, in some aspects, the data segmentation system 102 may automatically determine the collection strategy 124 based on the segment 122 and provide both the segment 122 and the collection strategy 124 to the client system 106. In one example, the data segmentation system 102 may receive data from the client system 106 associated with each strategy and the one or more segments the strategy is applicable to. In another example, the data segmentation system 102 may independently suggest the collection strategy 124, where the collection strategy can be suggested based on various factors, such as certain business rules (that is, charity rules, write-off rules), staff size, and whether the client has an auto dialer system versus manual dialing, among other similar factors.

To provide an example scenario, a woman may have an emergency delivery of her baby performed at a local hospital. The total cost of the emergency procedure may be $30,000. However, the woman may have insurance, and only be responsible for $2,000 of that total cost. Therefore, the $2,000 (e.g., one variable of the accounts receivable data 108) may be input to the model along with other data associated with the woman, such as her credit score of 750 (e.g., one variable of the credit related data 116) and no outstanding balances revealed by her past payment history (e.g., one variable of the payment history data 112). Based on this input, the model may yield a predicted unit yield of $1,800 and a predicted recovery rate of 80%, where the predicted recovery value may be a weighted average of the unit yield and recovery rate. The predicted recovery value may fall within the range of recovery values corresponding to segment two based on the segment boundaries provided by the local hospital. Therefore, the data segmentation system 102 may provide the segment two to the local hospital along with the $2000 amount owed as output. The local hospital may then utilize the segment two assignment to determine a collections strategy for collecting the $2,000 from the woman. For example, in this example, segment two may indicate a good likelihood that the client will pay a majority of the remaining costs due. Therefore, the local hospital may devote resources to having staff follow up with phone calls or letters to the woman.

As another example, if the payment history data 112 of the woman in the previous example revealed three previous accounts totaling to $1,500.00 and two of them are in bad debt, the woman may be instead assigned to a segment four. For example, based on this input, the model may yield a predicted unit yield of $800 and a predicted recovery rate of 33%, where the predicted recovery value may be a weighted average of the unit yield and recovery rate. The predicted recovery value may fall within the range of recovery values corresponding to segment four based on the segment boundaries. Adjustment of the classification to segment four may indicate that even though the woman has a good credit score and insurance, etc., the woman is less likely to make payments to the hospital than if the woman had no previous outstanding balances. Hence, as illustrated by these examples, the input data 120 for the individual includes a plurality of variables influencing the recovery value, and a change in one or more of the variables may drastically shift the segment assigned for the individual.

In further example aspects, recovery values 128 for individuals serviced by the client (as well as a plurality of other clients) may be provided from the data segmentation system 102 to the comparison system 104. The recovery values 128 may serve as a standard metric for comparison across the plurality of clients to reveal how collection efforts of one client are comparing to other clients as a whole. For example, the recovery values 128 for each of the plurality of clients may be aggregated and averaged for comparison to the average recovery values for the client to produce comparison results 130.

Additionally, to make the comparison results 130 more meaningful to the client, the comparison results 130 may be returned according to the client's segments. For example, the client's segmentation boundaries may be provided to the comparison system 104 and applied to the aggregated recovery values from the plurality of clients to determine the average recovery value for each of the client's segments across the plurality of clients. This enables direct comparison to the average recovery values of the client for each segment. Therefore, the client is enabled to see in which particular segments the client is over performing or underperforming compared to other clients and may adjust resources accordingly. In some examples, the comparison may be across an entirety of clients, where in some aspects, the entirety of clients may be located within a defined geographical area (e.g., nation, state, city, county, etc.). In other examples, the comparison may be across a subset of clients having similar demographics to provide an "apples to apples" comparison.

Figure 2:
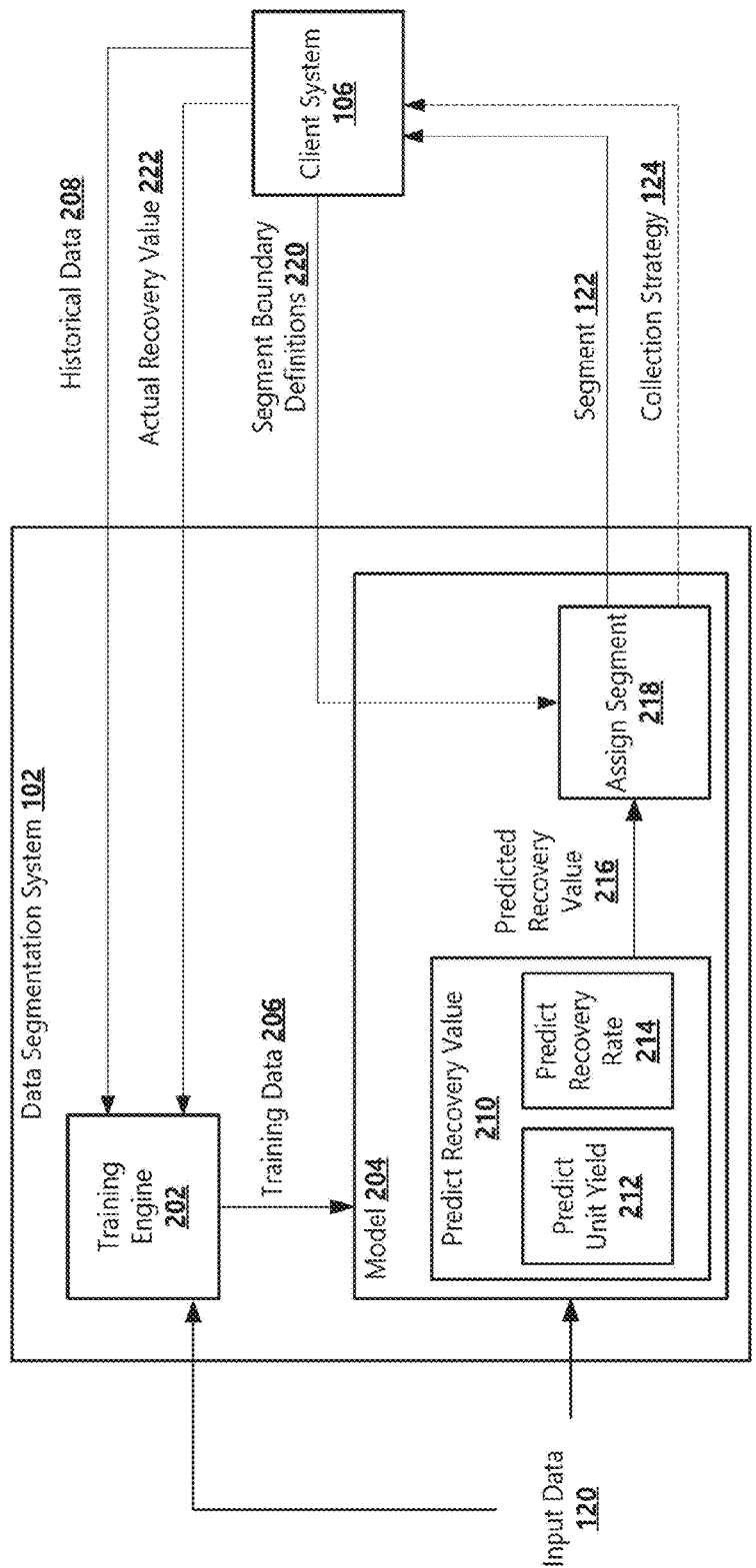
FIG. 2 is a block diagram illustrating an example data segmentation system in accordance with some embodiments.

FIG. 2 is a block diagram 200 depicting further aspects of a data segmentation system 102. An example data segmentation system 102 may include at least a training engine 202 and a model 204.

The training engine 202 may use historical data 208 received from the client system 106 to produce training data 206. In example aspects, the historical data 208 may correspond to a predetermined time period. For example, the historical data 208 may include data for individuals who received services from the client in the previous six months. The historical data 208 may include input data and an actual recovery value for each of those individuals. Accordingly, the modeling of the training data 206 may reveal relationships between the input data and the actual recovery value.

The input data provided as part of the historical data 208 may be similar to the input data 120, including accounts receivable data 108, payment history data 112, and credit related data 116 for each of the individuals serviced by the client in the past. The actual recovery value provided as part of the historical data 208 may include an actual unit yield and an actual recovery rate based on the amount the individual actually paid toward the cost of the service. For example, the actual unit yield may be the actual monetary amount received from the individual. The actual recovery rate may be the ratio of the monetary amount received from the individual to a total monetary amount due for the service. For example, if a client was responsible for $10,000 worth of service, and paid $8,000 of the total, the actual unit yield may be $8,000 and the actual recovery rate may be 80% or 0.8.

Figure 3A:
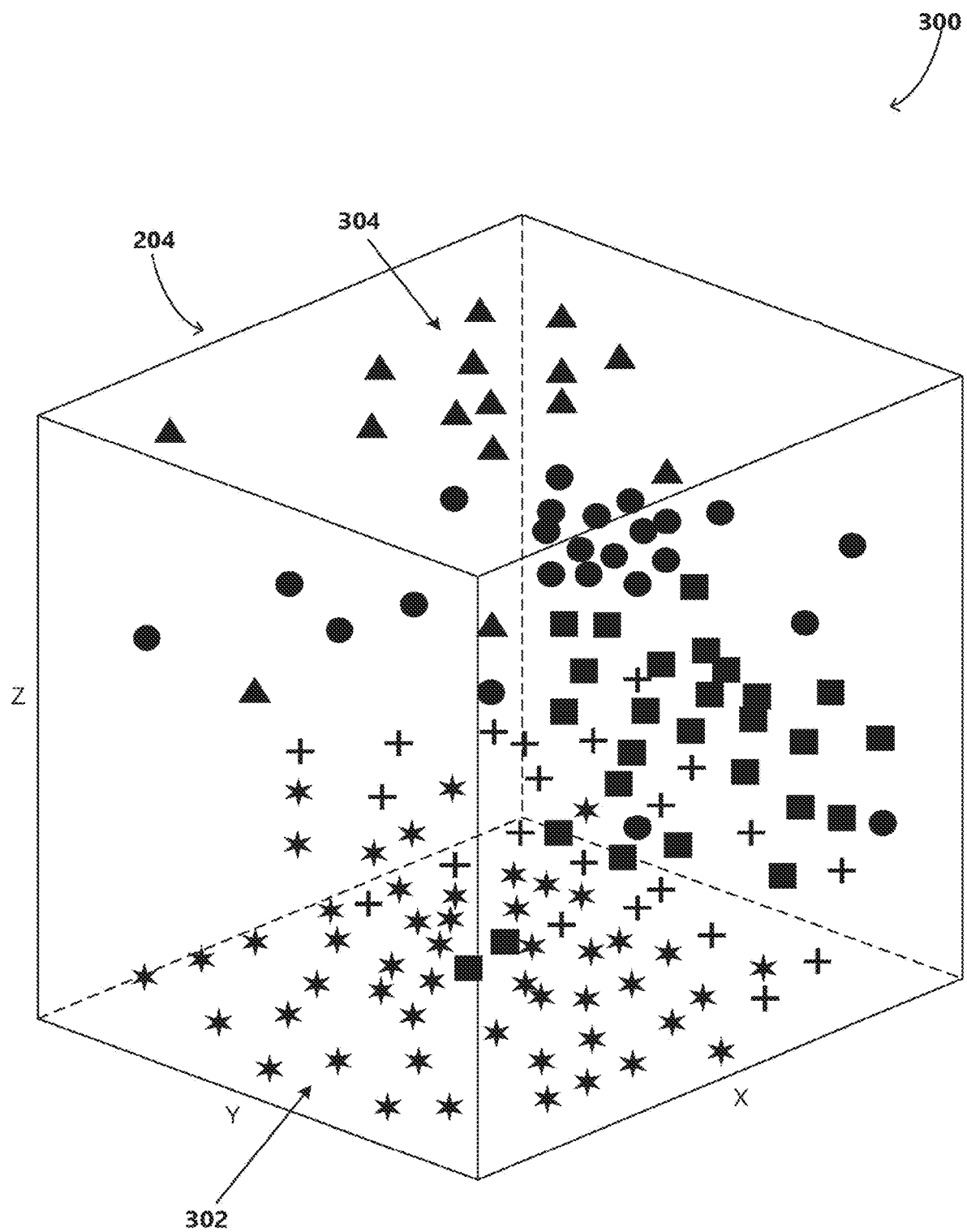
FIG. 3A is a diagram illustrating an example model of the data segmentation system in accordance with some embodiments.
Figure 3B:
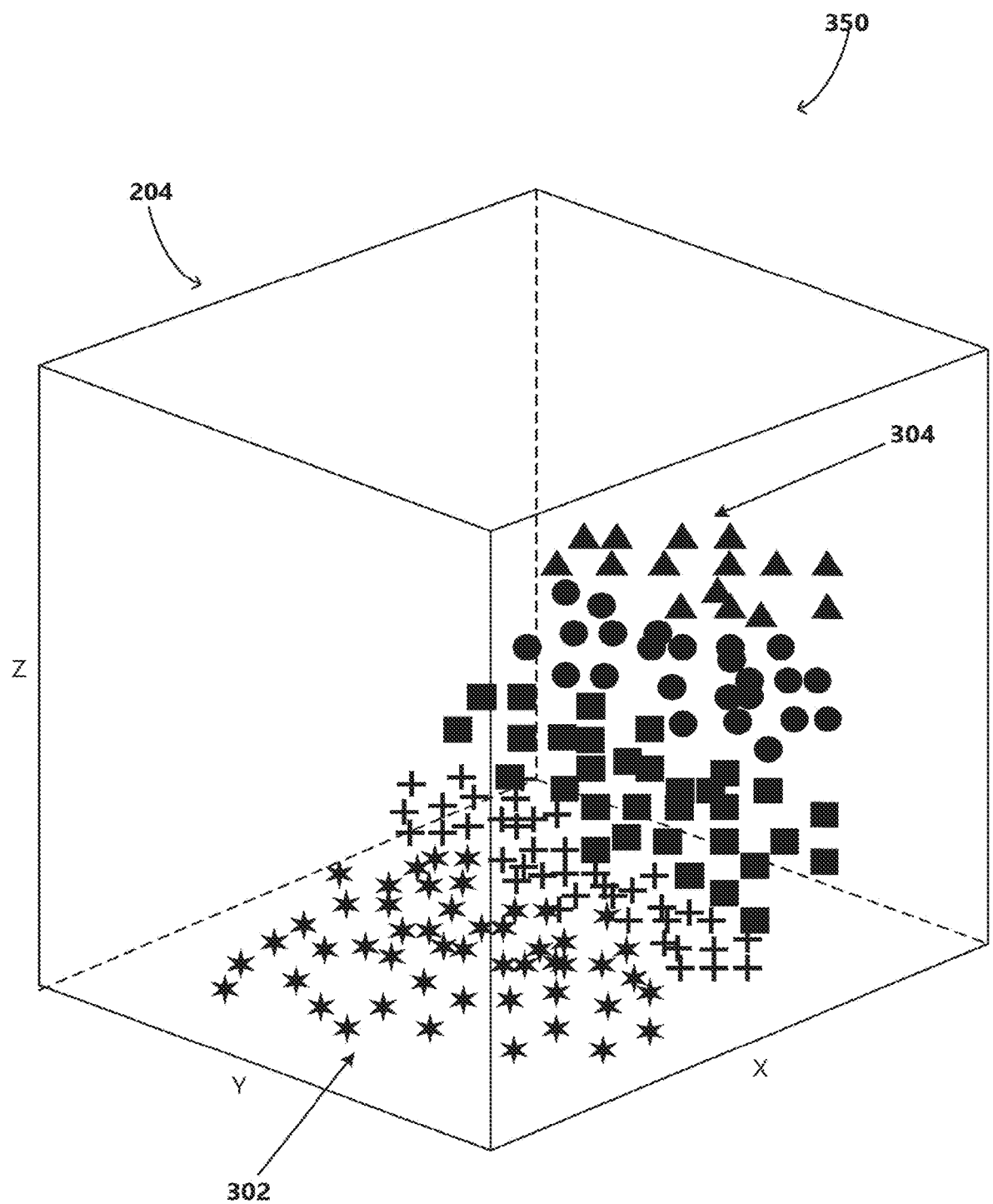
FIG. 3B is a diagram illustrating the example model of the data segmentation system following spline interpolation in accordance with some embodiments.

The model 204 may be built based on the training data 206. An example of the model is illustrated in FIGS. 3A and 3B, described in further detail below. The model 204 may be hyper-dimensional, having a dimension for each variable within the training data 206 (e.g., each of the various input data and the unit yield and the recovery rate comprising the actual recovery value). For example, each individual may be represented by a single data point in the model 204, where a unit yield may be represented on an x-axis, a recovery rate may be represented on a y-axis, a credit score may be represented on a z-axis, a cost responsibility may be represented on an n-axis, etc. In some aspects, spline interpolation may be performed in each dimension to smooth the data in the model 204.

Regression analysis may be performed on the data within the model 204 to estimate relationships among the variables, such as the various types of input data and the actual recovery value. For example, the actual recovery value may be a dependent variable of interest, where the various types of input data may be independent variables influencing the actual recovery value. As a result of the regression analysis, a formula may be generated that represents the estimated relationship between the various types of input data and the actual recovery value. For example, if a value for each of the various types of input data are plugged into the formula, the recovery value (e.g., the weighted average of the unit yield and the recovery rate) may be computed as output.

Once the model 204 has been trained, the model 204 may then be implemented at operation 210 to determine a predicted recovery value 216 for a new individual (e.g., an individual who recently received a service) by leveraging the estimated relationship determined by the regression analysis. For example, the input data 120 for the new individual may be fed into the model 204 (e.g., the generated formula) to predict a unit yield at operation 212 and predict a recovery rate at operation 214. The predicted unit yield may be the total monetary amount predicted to be received from the individual and the predicted recovery rate may be the predicted percentage of the total amount that the individual will pay. A weighted average of the predicted unit yield and the predicted recovery rate may then yield the predicted recovery value 216 for the individual.

The individual may then be assigned a segment 122 at operation 218. For example, the segment 122 for the individual may be assigned based on the predicted recovery value 216 determined at operation 210 and segment boundary definitions 220 received from the client system 106. The segment boundary definitions 220 may include boundaries for a plurality of segments. For example, each segment may comprise a range of recovery values. Therefore, the segment 122 assigned may be the segment 122 having a range of recovery values within which the predicted recovery value 216 falls.

In some aspects, the segment 122 may then be provided to the client system 106 for use in determining a collection strategy. Optionally, in some aspects, the data segmentation system 102 may automatically determine the collection strategy 124 based on the segment 122 and provide both the segment 122 and the collection strategy 124 to the client system 106. As one example, the data segmentation system 102 may receive data from the client system 106 associated with each strategy and the one or more segments the strategy is applicable to. As another example, the data segmentation system 102 may independently suggest the collection strategy 124, where the collection strategy can be suggested based on various factors, such as certain business rules (that is, charity rules, write-off rules), staff size, and whether the client has an auto dialer system versus manual dialing, among other similar factors.

The model 204 may be continuously updated over time. For example, once an actual recovery value 222 is determined for the new individual, the actual recovery value 222 may be provided along with the input data 120 of the new individual to the training engine 202 to update the training data 206 and subsequently the model 204. The model 204 may be updated by using the actual recovery value 222 as either learning data or as validation data. For example, the model 204 may be patched based on the actual recovery value 222. Patching of the model 204 may include updating weights assigned to one or more variables or adding or removing one or more variables from the model 204. In some aspects, the model 204 is updated multiple times until an acceptable error rate for the model 204 is achieved.

In addition to updating the model 204, the segment boundary definitions 220 of the client may be updated as well. For example, one or more boundaries associated with one or more segments of the model 204 may be adjusted based on the actual recovery value 222.

FIG. 3A is a diagram 300 illustrating an example model 204 of the data segmentation system 102 in accordance with some embodiments. As previously discussed in conjunction with FIG. 2, the model 204 may be hyper-dimensional, having a dimension for each data variable used to train the model 204. For example, the training data 206 may be produced from historical data 208 comprised of various types of input data (e.g., accounts receivable data 108, payment history data 112, and credit related data 116) and an actual recovery value including an actual unit yield and an actual recovery rate for each of a plurality of individuals that have historically received services from the client. Therefore, the model 204 may include a dimension for each of the various types of input data, the actual unit yield, and the actual recovery rate. Each individual from the plurality of individuals that have historically received services from the client may be represented by a corresponding data point in the hyper-dimensional space.

Additionally, segment boundary definitions 220 may be received from the client and applied to the data within the model 204. The segment boundary definitions 220 may define a plurality of segments based on recovery values. For example, each segment may correspond to a range of recovery values. Accordingly, each data point may be illustrated by a different symbol type based on the segment into which a corresponding individual is classified or assigned. The segment may inform one or more collections strategies applied to the individuals assigned to the segment.

To provide an example, a first set of data points 302, illustrated as stars in FIGS. 3A and 3B, may represent individuals assigned to a first segment. In example aspects, the first segment includes non-paying individuals. That is, the first segment includes individuals who made no payment within a predetermined time period after the service was rendered (e.g., actual unit yields and actual recovery rates of 0). For first segment individuals, the collection strategy may be to send invoices of the individuals to a debt collection agency or to write off the invoices under charitable deductions. Thus, the client optimizes their collections effort by circumventing certain collections activities, such as sending letters or calling the individuals that are wasting limited resources and are unlikely to be successful in persuading these non-paying individuals to pay.

As another example, a second set of data points 304, illustrated as triangles in FIGS. 3A and 3B, may represent individuals assigned to a second segment. In example aspects, clients in the second segment have low balances and may be able and likely to pay those amounts. However, because these balances are low, actions for collection on these client accounts may not be prioritized.

The various other sets of data points illustrated as circles, squares, and crosses that fall in between the first set of data points 302 and the second set of data points 304 in FIGS. 3A and 3B may represent other segments. In example aspects, these other segments include individuals who have higher balances and may have paid some towards their owed amounts. Therefore, it may be worthwhile for the client to contact individuals in these segments to obtain payments from or to enroll in payment plans, for example. That is, these segments may be prioritized, and more collection strategy resources dedicated to these clients.

As illustrated in FIG. 3A, the boundaries of the segments of the model 204 are not well defined. Outlier data points may also make it difficult to define. To provide better definition, the boundaries of the segments may be smoothened using a polynomial interpolation method, such as spline interpolation. During the interpolative smoothening, equidistant points in a dimension of the model 204 may be picked by density of the data, and a curved line set for those equidistant points. The process may be repeated in each dimension of the model 204. The combination of the curved lines may then become a smooth surface. The result of spline interpolation on the model 204 is illustrated in FIG. 3B.

FIG. 3B is a diagram 350 illustrating an example model 204 of the data segmentation system 102 following spline interpolation in accordance with some embodiments. Interpolative smoothening may lower a variability in the modeled data in order to ascertain a more accurate expected value of the reward of the collection effort (e.g., a more accurate recovery value) and thus enable more accurate segment assignment. For example, the z axis may represent a recovery rate, and following spline interpolation, the second set of data points 304 in the model 204 of FIG. 3B reveal a lower recovery rate than the second set of data points 304 in the model 204 of FIG. 3A. This results from a subset of the first set of data points 302 being underneath the second set of data points 304 in FIG. 3A that, when identified, dilutes the recovery rate of the second set of data points 304 to the level illustrated in FIG. 3B. For example, the recovery rate may be diluted from a rate of about 90% to a rate of about 60%.

Figure 4:
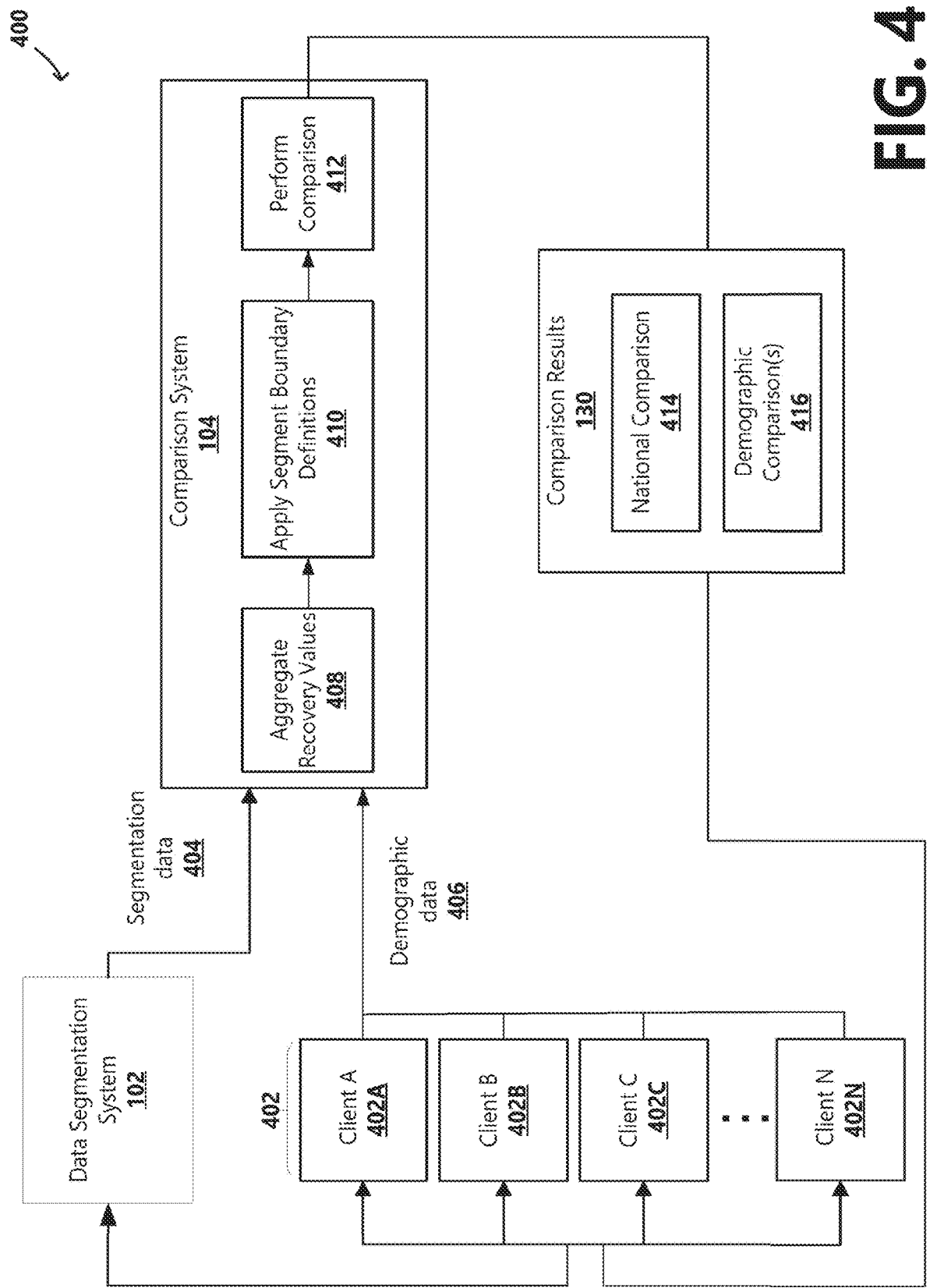
FIG. 4 is a block diagram illustrating an example comparison system in accordance with some embodiments.

FIG. 4 is a block diagram 400 illustrating an example comparison system 104 in accordance with some embodiments. In some examples, the comparison system 104 may be integrated with a data segmentation system 102 in a single system. In other embodiments, the comparison system 104 may be a separate system communicatively coupled to the data segmentation system 102.

The data segmentation system 102 may build a plurality of models similar to model 204, where each of the plurality of models is specific to a particular client. For example, the data segmentation system 102 may build models specific to each of a plurality of clients 402A, 402B, 402C, and 402N, collectively clients 402, as described in detail in conjunction with FIG. 2. Recovery values for each individual serviced by the clients 402 (e.g., actual recovery values used to train/update the respective models) may serve as a consistent performance metric across the clients 402, and may be provided from the data segmentation system 102 to the comparison system 104. Additionally, the data segmentation system 102 (or alternatively the clients 402) may provide the segment boundary definitions for each client to the comparison system 104 to allow for a more meaningful comparison to a requesting client, as described in detail below. The recovery values and segmentation boundary definitions received at the comparison system 104 may be collectively referred to as segmentation data 404. In some aspects, permission to receive and store the segmentation data 404 may be provided by the clients 402 via contractual obligations with the provider of the data segmentation system 102 and/or the comparison system 104, or via a UI functionality user agreement wherein upon utilizing the comparison system 104 to receive comparison results 130 the client agrees to share its data.

Demographic data 406 for each of the clients 402 may be provided by the respective clients 402 to the comparison system 104. Examples of the demographic data 406 provided may include a type of the client (e.g., a hospital, a health clinic, a diagnostic center, a doctor's office, etc.), a location of the client (e.g., inner city, suburban, rural), and an average level of income of individuals receiving service from the client (e.g., upper class, middle class, lower class), among other demographic data. For example, Client A 402A may a hospital located in a rural area servicing individuals with a low to middle median income, Client B 402B may be a small health clinic located in the inner city that works largely off of charity, and Client C 402C may be a hospital located in a suburb servicing individuals with a high median income.

Upon receipt of a request for a comparison from a given client (e.g., a requesting client), the comparison system 104 may aggregate recovery values for one or more of the clients 402 at operation 408. The recovery values may be aggregated based on a type of comparison requested. As one example, the request may be for a comparison across an entirety of the clients 402. Therefore, recovery values for the entirety of the clients may be aggregated. In some aspects, the entirety of the clients 402 may be spread over a particular geographical area, such as a nation, and thus the comparison yielded may be a national comparison (e.g., national comparison 414). As another example, the request may be for a comparison across a subset of the clients 402 that are demographically similar to the requesting client (e.g., demographic comparisons 416). For example, if the requesting client is Client A 402A, the hospital located in the rural area servicing individuals with a low to middle median income, it may be more insightful for Client A 204A to compare its collections efforts to those of other similar rural hospitals, rather than inner city or suburban hospitals servicing different types of individuals. The demographic data 406 may be used to aid in determinations of demographically similar clients. In further examples, the request may be for more than one comparison, where the comparisons are a mix of national and demographic related comparisons.

To make the comparison results more meaningful to the requesting client, at operation 410, segment boundary definitions for the requesting client may be applied to the aggregated recovery values so that the comparison may be performed on a per segment basis corresponding directly to the segments of the requesting client. For example, if the requesting client has five segments defined. The aggregate recovery values may be divided within those five segments as defined by the requesting client.

Then, at operation 412 the comparison may be performed. For example, for each segment, aggregated recovery values falling within the segment may be averaged to produce an average aggregated recovery value across the clients for each segment. Similarly, for each segment, the requesting client's recovery values falling within the segment may be averaged. The average aggregated recovery value across the clients may then be directly compared to the average recovery value of the requesting client on a per segment basis. In some examples, the comparison may further be broken down to a comparison of the average unit yield and the average recovery rate across the clients to the average unit yield and the average recovery rate of the requesting client.

The comparison results 130 may then be provided to the requesting client for use in collections strategies optimization. The comparison results may include one or more of a national comparison 414 (or other similar geographic based comparison, such as state-wide, city-wide, etc.) and demographic comparisons 416 based on a type of comparison requested. The comparison results 130 may be provided in a graphical and/or tabular form as illustrated in FIG. 5.

The comparison results 130 may allow the requesting client to directly compare its recovery values in each segment to those same metrics averaged nationally and/or demographically to determine whether they are comparatively collecting successfully, average, or poorly in one or more of the segments. The requesting client may then adjust their collection strategies for each segment accordingly. For example, if the requesting client is Client A 402A, and the comparison results 130 indicate that nationally they are not collecting as successfully from clients falling within segment two, Client A 402A may dedicate more resources to those individual assigned to segment two (e.g., use more aggressive collection strategies such as phone calls and letters) to try to increase amounts collected from individuals within segment two.

Figure 5:
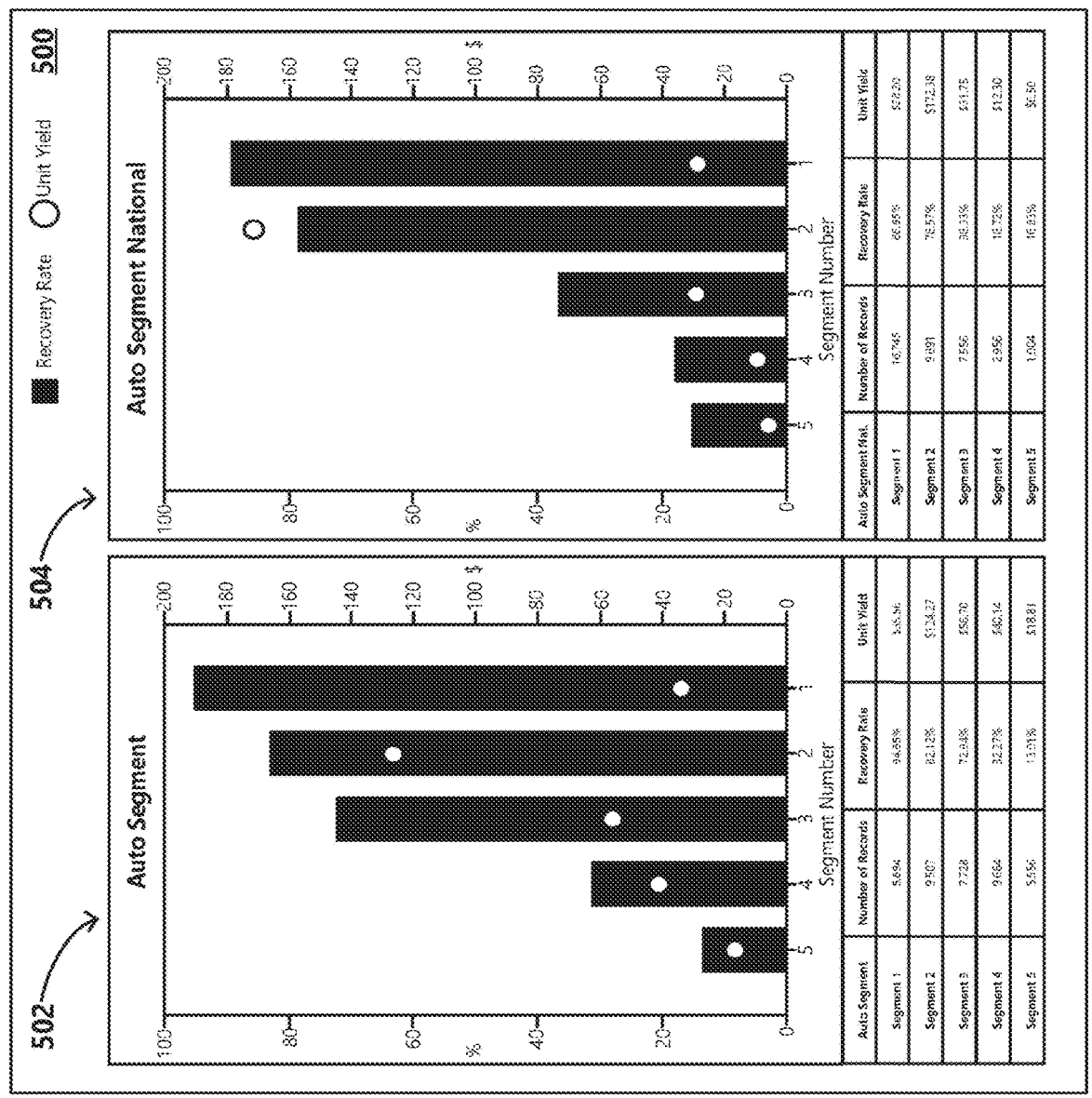
FIG. 5 is an example user interface (UI) displaying comparison results in accordance with some embodiments.

FIG. 5 is an example user interface (UI) 500 displaying comparison results 130 in accordance with some embodiments. As illustrated, the comparison results 130 may include a national comparison 414. In other aspects, the comparison results 130 may additionally or alternatively include one or more demographic comparisons 416.

For example, a client may request to receive a national comparison. As described in greater detail in FIG. 4, the comparison system 104 may aggregate recovery values of individuals serviced by all clients nationwide, apply segmentation boundary definitions of the requesting client to the aggregated recovery values, and perform the comparison on a per segment basis by determining and comparing an average aggregated recovery value nationally to an average recovery value of the requesting client. The comparison system 104 may return within the comparison results 130 a first data set 502 and a second data set 504 for display in the UI 500. The first data set 502 displayed may provide the average recovery value of the requesting client for each segment of the requesting client. The second data set 504 displayed may provide an average aggregated recovery value for each segment across an entirety of clients nationally.

As illustrated, each of the first data set 502 and the second data set 504 may include one or more of a graph and a table to display the respective average recovery values. For example, the graph may have an x-axis representing the segments defined by the requesting client and a y-axis simultaneously representing an average recovery rate and an average unit yield (e.g., the recovery value). Specifically, the graph may include a bar for each segment depicting the average recovery rate for the respective segment, and a marker for each segment depicting the average unit yield for the respective segment, where the marker may be overlaid on the bar. The right hand side of the graph may be labeled along the y-axis according to the dollar amount for the average unit yield, whereas the left hand side of the graph may be labeled along the y-axis according to percentage for average recovery rate.

The table may include rows for each segment of the requesting client and columns indicating a number of records (e.g., a number of individuals within each segment), an average recovery rate, and an average unit yield for each segment. In some examples, the comparison requested may be a benchmark comparison. In such examples, the table may further include columns indicating an average national benchmark score, a median national benchmark score, and a standard deviation for the national benchmark score to allow for additional insight. As can be appreciated, other graphical and textual representations may be utilized to visualize the average recovery value on a per segment basis.

The first data set 502 may be directly compared to the second data set 504 to enable the requesting client to determine how their collection efforts compare on a per segment basis to other clients nationally and within which segments, if any, adjustments to collection strategies need to be made to optimize efforts. As one example, for individuals falling within segment five, the requesting client may have a recovery rate of about 13% and a unit yield of almost $19, whereas nationally clients may have a national recovery rate of almost 17% and the national unit yield of almost $6.50. Based on this comparison, the requesting client may determine that the national recovery rate is higher and thus the requesting client may consider devoting more resources into collecting from individuals assigned to segment five. However, because the national unit yield is lower, even if the requesting client put more resources into collecting from individuals assigned to segment five, the extra resources devoted may not be worth the low monetary reward gained from those individuals. Thus, depending on the comparisons in other segments, those extra resources may instead be allocated elsewhere to maximize return.

As another example, for individuals falling within segment one, the requesting client may have a recovery rate of almost 95% and a unit yield of about $35, whereas nationally clients may have a national recovery rate of almost 89% and a national unit yield of about $28. Based on this comparison, the requesting client may determine they have a better recovery rate and a unit yield than the national recovery rate and the national unit yield, and therefore no additional resources may need to be devoted to individuals assigned to segment one.

Figure 6:
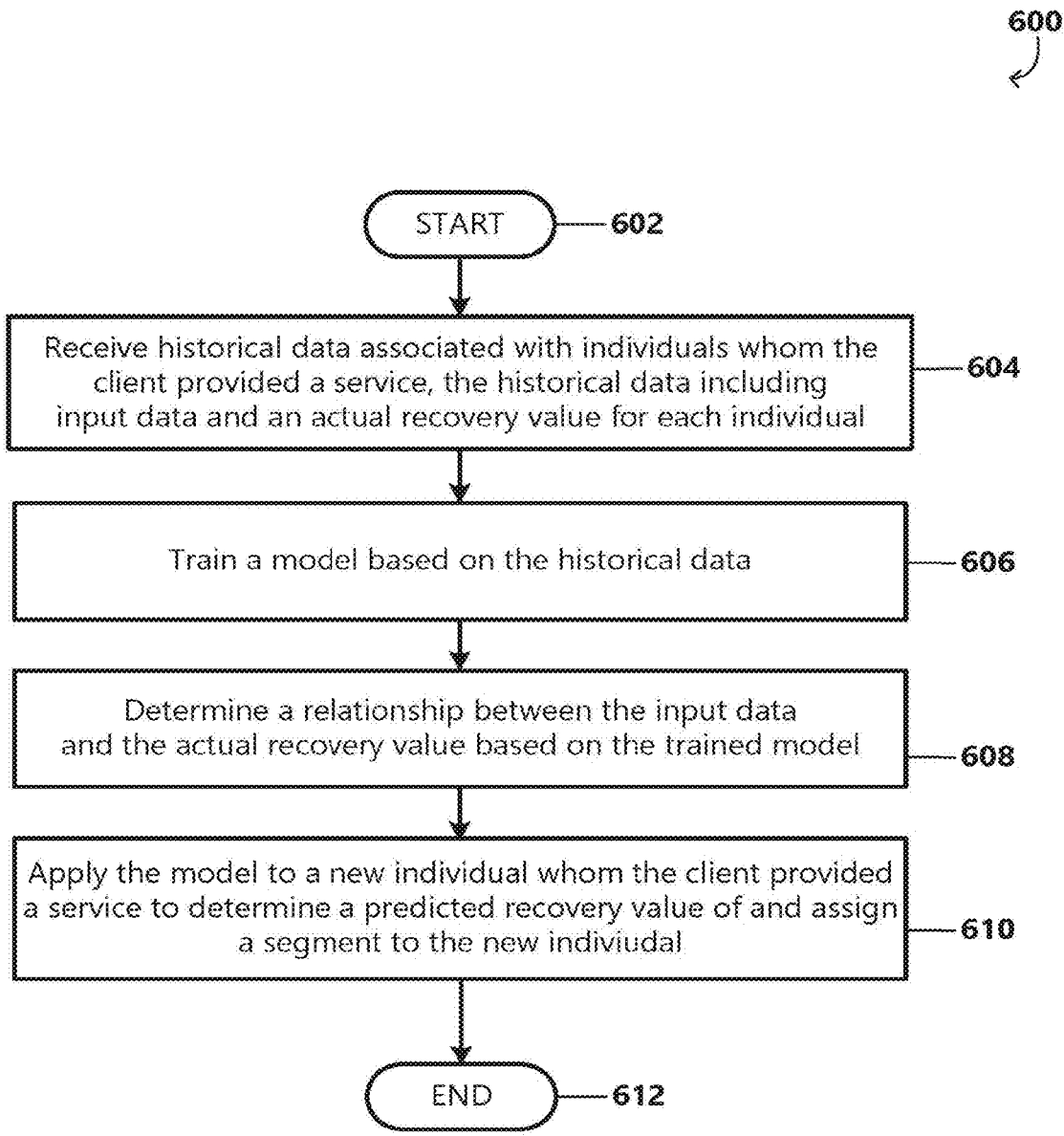
FIG. 6 is a process flow diagram illustrating an example method for training a model for automatic data segmentation.

FIG. 6 illustrates a method 600 of training a model for automatic data segmentation. In example aspects, the method 600 may be performed by the data segmentation system 102. The method 600 may start at operation 602 and proceed to operation 604, where historical data 208 associated with individuals whom the client has provided a service may be received. The historical data 208 may include input data and an actual recovery value for each individual serviced within a predetermined time period (e.g., individuals provided a service in the previous year). The input data of the historical data 208 may include accounts receivable data 108, payment history data 112, credit related data 116, and other attributes including a service type (e.g., an emergency visit, an inpatient visit, or an outpatient visit). The actual recovery value of the historical data 208 may be a weighted average of an actual unit yield and an actual recovery rate for an individual. The actual unit yield may be the actual monetary amount received from the individual. The recovery rate may be the ratio of the monetary amount received from the individual to a total monetary amount due for the service. Each type of input data, the actual unit yield, and the actual recovery rate may be considered variables of the historical data 208.

At operation 606, a model 204 may be trained based on the historical data 208 (e.g., the historical data 208 may be training data 206). The model 204 may be a hyper-dimensional model, where each variable of the training data 206 is represented by a unique dimension. Therefore, each data point in the model 204 represents an individual from the training data 206 corresponding to respective values of the variables in the hyper-dimensional space. In some examples, spline interpolation methods may be performed in each dimension to smooth the data.

At operation 608, a relationship between the variables of the historical data 208 (e.g., a relationship between the input data and the actual recovery value) may be determined based on the model by performing regression analysis, for example, on the data within the model 204. In some examples, the actual recovery value may be the dependent variable of interest, where the various types of input data may be the independent variables influencing the actual recovery value. As a result of the regression analysis, a formula may be generated to represent the estimated relationship between the variables. For example, if a value for each of the various types of input data are plugged into the formula, the recovery value (e.g., the weighted average of the unit yield and the recovery rate) may be computed as output.

By leveraging the relationships determined by the regression analysis, the model 204 may be applied to predict a recovery value of and assign a segment to a new individual whom the client provided a service at operation 610, as described in greater detail in conjunction with FIG. 7 below. The method may then end at operation 612.

Figure 7:
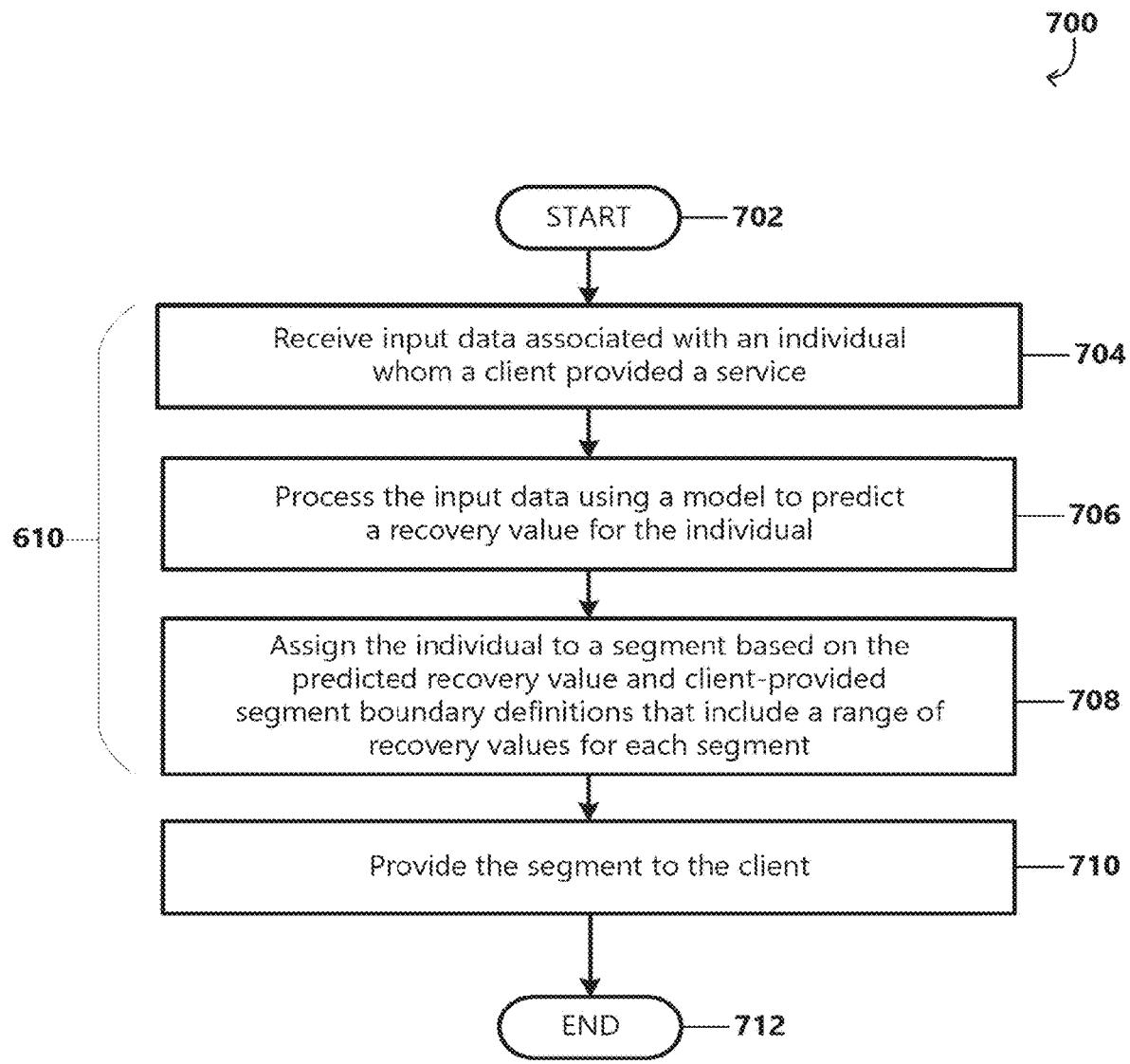
FIG. 7 is a process flow diagram illustrating an example method for automatic data segmentation in accordance with some embodiments.

FIG. 7 illustrates a method 700 for automatic data segmentation. In example aspects, the method 700 may be performed by the data segmentation system 102, and operations 704 through 708 can be used to at least partially perform the operation 610.

The method 700 may start at operation 702 and proceed to operation 704, where input data 120 associated with an individual whom a client provided a service may be received. For example, the individual may have recently received a service from a client, and the client may want to determine which collection strategy to apply for the individual to most effectively collect a balance from the individual. In example aspects, the input data 120 includes accounts receivable data 108 (e.g., a total amount owed, a remaining balance owed), payment history data 112 (presence of debts), credit related data 116, and other attributes (e.g., whether the individual has insurance or not, service type (emergency visit, inpatient visit, outpatient visit).

At operation 706, the input data 120 may be processed using a model 204 to predict a recovery value (e.g., predicted recovery value 216) for the individual. The model 204 may be specific to the client. For example, the model 204 may be the model trained at operation 606 and used to determine the relationship between input data and recovery values of historical data 208 of the client at operation 608. In some example aspects, the values of the various types of input data 120 for the individual may be input into the formula generated based on the determined relationship from the model 204, and the predicted recovery value 216 may be provided as output of the formula.

At operation 708, the client may be assigned to a segment 122 based on the predicted recovery value 216 for the client and segment boundary definitions 220 received from the client, where the segment boundary definitions 220 may include a range of recovery values. For example, the segment 122 comprising the range of recovery values into which the predicted recovery value 216 falls may be assigned to the individual.

At operation 710, the segment 122 may be provided to the client. The segment 122 may be utilized by the client to determine a collection strategy for the individual. In some examples, the collection strategy may be determined by the data segmentation system 102 and may be provided, along with the segment 122, to the client. At operation 712 the method 700 ends.

Figure 8:
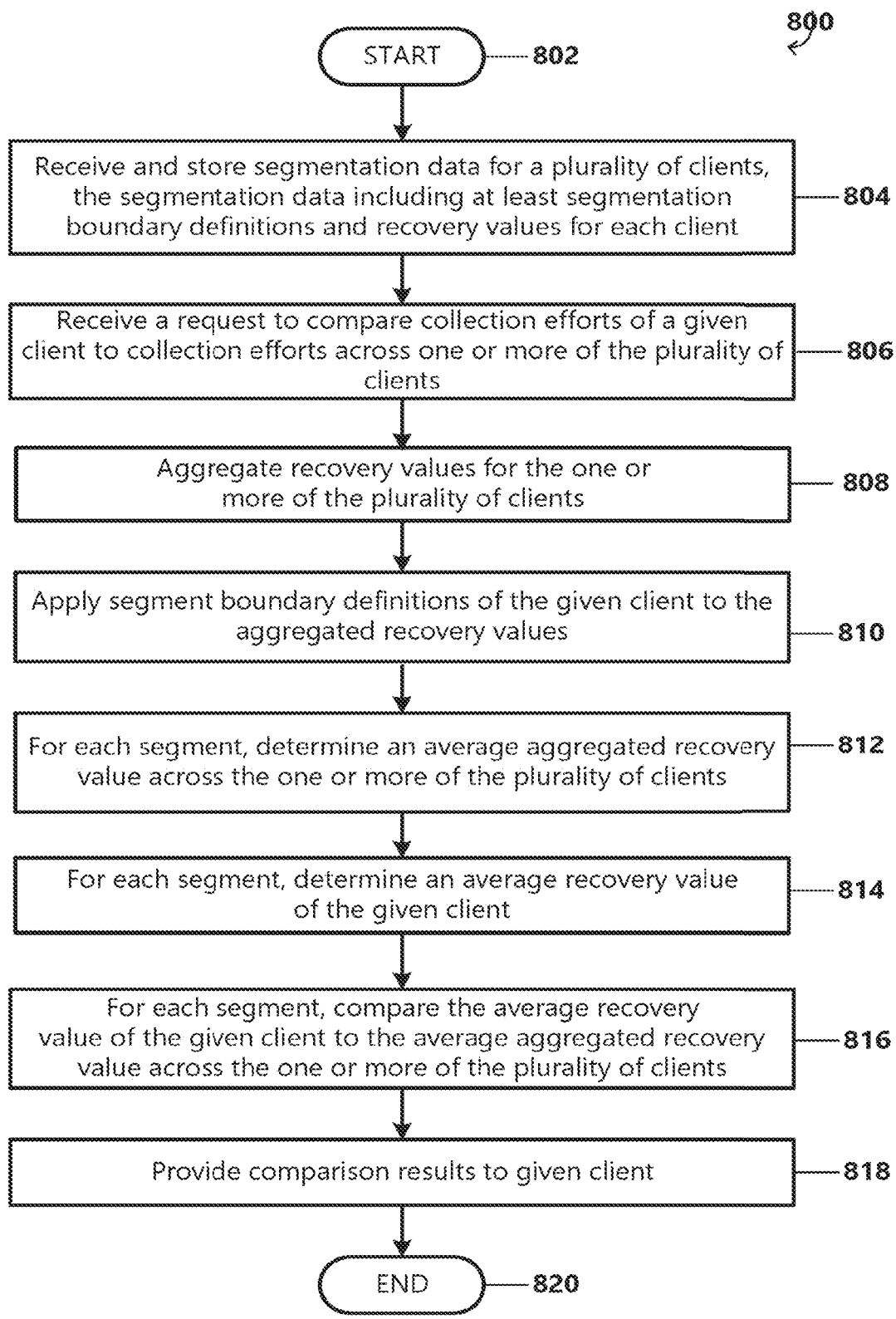
FIG. 8 is a process flow diagram illustrating an example method for comparing segmentation data across a plurality of clients in accordance with some embodiments.

FIG. 8 is a process flow diagram illustrating an example method 800 for comparing segmentation data across a plurality of clients 402. In example aspects, the method 800 may be performed by comparison system 104, where comparison system 104 may be integrated with the data segmentation system 102 or may be a separate system communicatively coupled to the data segmentation system 102.

The method 800 may start at operation 802 and proceed to operation 804, where the comparison system 104 may receive and store segmentation data 404 for a plurality of clients 402. The segmentation data 404 may include at least recovery values of individuals serviced and segment boundary definitions for each of the plurality of clients 402. Additionally, the comparison system 104 may receive other types of data, such as demographic data 406 associated with each of the plurality of clients 402.

At operation 806, the comparison system 104 may receive a request to compare collection efforts of a given client (e.g., client A 402A) to collection efforts across one or more of the plurality of clients 402. At operation 808, the recovery values for the one or more the plurality of clients 402 may be aggregated. The clients whose recovery values are aggregated may be based on a type of comparison requested. In one example, the requested comparison may be a national comparison. Therefore, recovery values for all of the clients within the nation may be aggregated. In another example, the requested comparison may be a demographic comparison. Therefore, recovery values for only a subset of clients that possess similar demographic characteristics to the given client (e.g., based on the demographic data 406) may be aggregated.

To allow a direct and meaningful comparison, recovery values across the clients 402 may be normalized based on the segments defined by the given client. For example, at operation 810, segment boundary definitions 220 of the given client may be applied to the aggregated recovery values. For example, the requesting client may have defined five segments, each segment corresponding to a particular range of recovery values. The aggregated recovery values may then be divided into those five segments.

Then, at operation 812, an average aggregated recovery value across the one or more of the plurality of clients 402 may be determined for each segment. For example, all aggregated recovery values falling within a same segment may be averaged together to produce an average aggregated recovery value for the particular segment, which may then be repeated for each segment. At operation 814, an average recovery value of the given client may be determined for each segment. For example, all recovery values for the given client falling within a same segment may be averaged together to produce an average recovery value for the particular segment, which may then be repeated for each segment.

At operation 816, for each segment, the average recovery value for the given client determined at operation 814 may be compared to the average aggregated recovery value across the plurality of clients determined at operation 812. The comparison results 130 may be provided to the given client at operation 818.

The comparison results 130 may be provided in a graphical and/or tabular form as illustrated in FIG. 5 so that they may be easily consumed and understood by the given client.

In example aspects, the comparison results 130 may break down the average recovery value for each segment into an average unit yield and an average recovery rate from which the average recovery value is comprised. The given client may use the comparison results 130 to determine in which segment(s) the given client is underperforming or overperforming relative to other clients nationally and/or demographically to help inform future adjustments of collection strategies and/or resource allocations. The method may end at operation 820.

Figure 9:
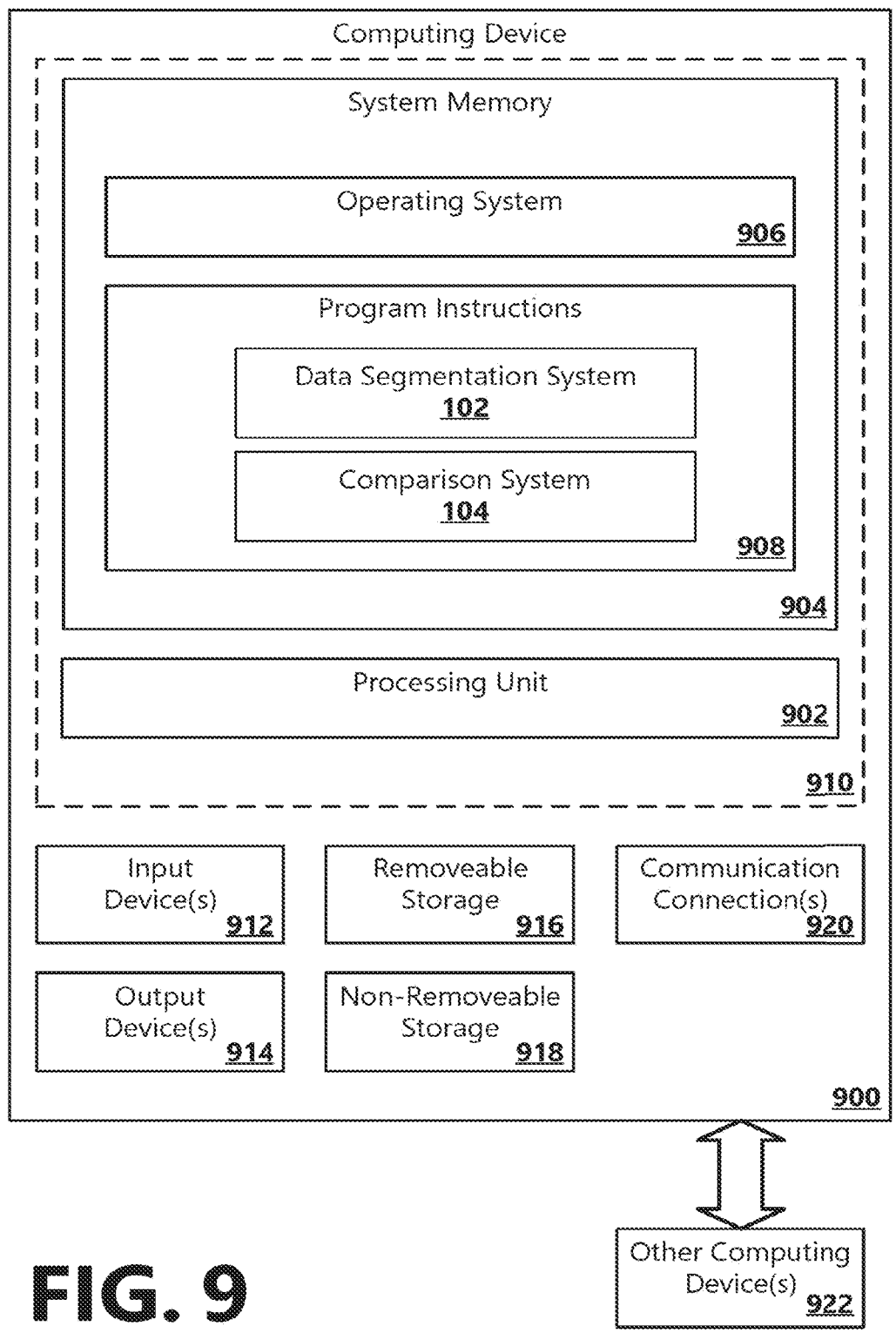
FIG. 9 is a block diagram illustrating physical components of an example computing device with which the data segmentation system may be practiced.

FIG. 9 is a block diagram illustrating physical components of an example computing device 900 with which aspects may be practiced. The computing device 900 can include at least one processing unit or processor 902 and a system memory 904. The system memory 904 may comprise, but is not limited to, volatile (e.g. random access memory (RAM)), non-volatile (e.g. read-only memory (ROM)), flash memory, or any combination thereof. System memory 904 can include operating system 906, one or more program instructions 908 including an automated executable having sufficient computer-executable instructions, which when executed, perform functionalities and features as described herein. For example, the one or more program instructions 908 can include one or more components of the data segmentation system 102 and the comparison system 104.

Operating system 906, for example, can be suitable for controlling the operation of computing device 900 and for instantiating a communication session between one or more local or remote systems/devices. Furthermore, aspects may be practiced in conjunction with a graphics library, other operating systems, or any other application program and is not limited to any particular application or system. This basic configuration is illustrated by those components within a dashed line 910. Computing device 900 can also include one or more input device(s) 912 (keyboard, mouse, pen, touch input device, etc.) and one or more output device(s) 914 (e.g., display, speakers, a printer, etc.).

The computing device 900 can also include additional data or memory storage devices (removable or non-removable) such as, for example, magnetic disks, optical disks, caching data structures, tape, etc. Such additional storage is illustrated by a removable storage 916 and a non-removable storage 918. Computing device 900 can also contain a communication connection 920 that can allow computing device 900 to communicate with other computing devices 922, such as over a network in a distributed computing environment, for example, an intranet or the Internet. Communication connection 920 is one example of a communication medium, via which computer-readable transmission media (i.e., signals) may be propagated.

Programming modules can include routines, programs, components, data structures, and other types of structures that can perform particular tasks or that can implement particular abstract data types. Moreover, aspects can be practiced with other computer system configurations, including hand-held devices, multiprocessor systems, microprocessor-based or programmable client electronics, minicomputers, mainframe computers, and the like. Aspects can also be practiced in distributed computing environments where tasks are performed by remote processing devices that are linked through a communications network. In a distributed computing environment, programming modules can be located in both local and remote memory storage devices.

Furthermore, aspects can be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects can also be practiced using other technologies capable of performing logical operations such as, for example, AND, OR, and NOT, including, but not limited to, mechanical, optical, fluidic, and quantum technologies. In addition, aspects can be practiced within a general purpose computer or in other circuits or systems.

Aspects can be implemented as a computer process (method), a computing system, or as an article of manufacture, such as a computer program product or computer-readable storage medium. The computer program product can be a computer storage medium readable by a computer system and encoding a computer program of instructions for executing a computer process. Accordingly, hardware or software (including firmware, resident software, microcode, etc.) can provide aspects discussed herein. Aspects can take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media.

Aspects described herein may be used in various distributed computing environments where tasks are performed by remote processing devices that are linked through a communications network. Aspects described herein can be implemented via local and remote computing and data storage systems. Such memory storage and processing units can be implemented in a computing device. Any suitable combination of hardware, software, or firmware may be used to implement the memory storage and processing unit. For example, the memory storage and processing unit may be implemented with computing device 900 or any other computing devices 922, in combination with computing device 900, wherein functionality can be brought together over a network in a distributed computing environment, for example, an intranet or the Internet, to perform the functions as described herein. The systems, devices, and processors described herein are provided as examples; however, other systems, devices, and processors can comprise the aforementioned memory storage and processing unit, consistent with the described aspects.

According to some aspects, a system for automatic data segmentation is provided. An example system may include a processing unit and a memory coupled to the processing unit. The memory may store instructions that, when executed by the processing unit, may cause the system to receive, from a plurality of data sources, input data associated with an individual whom a client has provided a service, the input data including one or more of accounts receivable data, payment history data, and credit related data associated with the individual, process the input data using a model to predict a recovery value for the individual, assign the individual to a segment based on the predicted recovery value and boundary definitions for a plurality of segments received from the client, the boundary definitions including a range of recovery values for each segment, and provide the segment to the client, wherein the segment informs the client of a collection strategy for the individual.

In other aspects, historical data associated with individuals whom the client provided a service may be received from the client, and the model may be trained with the historical data, where the historical data may include at least input data and a recovery value associated with each individual. The model may be a hyper-dimensional model that includes a dimension for each variable of the historical data. Each individual from the historical data may be represented as a data point corresponding to a value for each variable in the hyper-dimensional model. Spline interpolation may be performed within each dimension of the model.

In further aspects, regression analysis may be performed on the model to determine a relationship between the input data and the recovery value, and generate a formula based on the determined relationship. To process the input data using the model to predict the recovery value for the individual, the input data may be provided as input to the formula to receive the predicted recovery value as output. In response to receiving an actual recovery value for the individual, the model may be updated based on the actual recovery value.

In yet further aspects, segmentation data of the client may be provided to a comparison system communicatively coupled to the system, where the segmentation data may include at least the boundary definitions and recovery values for individuals serviced by the client, and the segmentation data may be used by the comparison system to compare collection efforts of the client to collection efforts across a plurality of clients. The recovery value may be a weighted average of a unit yield and a recovery rate, the unit yield may be a monetary amount received from the individual for the service, and the recovery rate may be a ratio of the monetary amount received from the individual to a total monetary amount due for the service.

In additional aspects, the accounts receivable data may include a total amount owed for the service, an amount owed by a guarantor, an amount owed by the individual, a remaining balance owed by the individual, and/or any payments. The payment history data may include invoices created for the individual over a predetermined time period, payments received from the individual for the invoices, a time gap between creation of the invoices and receipt of the payments, unpaid invoices, and/or time delays associated with the unpaid invoices. The credit related data may include a credit score, credit report data, and/or a healthcare-specific credit score of the individual.

According to some examples, a data segmentation method is provided. An example data segmentation method includes receiving, from a plurality of data sources, input data associated with an individual whom a client has provided a service, the input data including one or more of accounts receivable data, payment history data, and credit related data associated with the individual, and processing the input data using a model to predict a recovery value for the individual. The example data segmentation method may also include assigning the individual to a segment based on the predicted recovery value and boundary definitions for a plurality of segments received from the client, the boundary definitions including a range of recovery values for each segment, and providing the segment to the client, where the segment may inform the client of a collection strategy for the individual.

In other examples, the model may be trained with historical data associated with individuals whom the client provided a service, where the historical data may include at least input data and a recovery value associated with each individual. Regression analysis may be performed on the model to determine a relationship between the input data and the recovery value. A formula may be generated based on the determined relationship, where to process the input data using the model to predict the recovery value for the individual, the input data may be provided as input to the formula and the predicted recovery value may be received as output.

In further examples, the collection strategy may be determined based on the segment, and the collection strategy may be provided to the client along with the segment. Segmentation data of the client may be provided to a comparison system, where the segmentation data may include at least the boundary definitions and recovery values for individuals serviced by the client, and the segmentation data may be used by the comparison system to compare collection efforts of the client to collection efforts across a plurality of clients.

According to some aspects, a comparison system is provided. An example comparison system may include a processing unit, and a memory coupled to the processing unit. The memory may store instructions that, when executed by the processing unit, cause the system to receive and store segmentation data for a plurality of clients, the segmentation data for each client including at least boundary definitions for a plurality of segments and recovery values of individuals serviced, receive a request to compare collection efforts of a given client to collection efforts across one or more of the plurality of clients, aggregate recovery values for the one or more of the plurality of clients; and apply boundary definitions of the given client to the aggregated recovery values. The system may be further caused to, for each segment: determine an average aggregated recovery value across the plurality of clients, determine an average recovery value of the given client, and compare the average recovery value of the given client to the average aggregated recovery value across the plurality of clients and provide comparison results to the given client.

In other aspects, the request to compare collection efforts of the given client to collection efforts across the one or more of the plurality of clients may include a request to compare across an entirety of clients and/or a request to compare across a subset of clients having similar demographic characteristics to the given client. The comparison system may be further caused to receive and store demographic data associated with each of the plurality of clients to enable the comparison across the subset of clients.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described can be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A system for automatic data segmentation, the system comprising:
   one or more processors; and
   a non-transitory computer readable medium having stored thereon instructions that, when executed by the one or more processors, cause the one or more processors to:
      receive, from a client system, input data associated with a first individual of a first plurality of individuals for whom a client system has provided a service;
      input, into a hyperdimensional model, the input data, wherein the hyperdimensional model has been trained by a training engine to generate predicted recovery values by:
         collecting historical data from the client system, wherein the historical data comprises historical input data and a plurality of actual recovery values, the historical input data and the plurality of actual recovery values corresponding to a second plurality of individuals for whom the client system has previously provided a service,
         generating first training data based on the historical data, wherein the hyperdimensional model comprises a plurality of dimensions, and wherein each dimension in the plurality of dimensions corresponds to a variable of the first training data, and
         training the hyperdimensional model using the first training data;
      receive, from the hyperdimensional model, a predicted recovery value for the first individual, wherein the predicted recovery value is a weighted average of a predicted unit yield and a predicted recovery rate for the first individual;
      receive, from the client system, a plurality of segment boundary definitions that define a plurality of segments, where each of the plurality of segments correspond to a range of recovery values;
      based on the predicted recovery value, assign the first individual to a first segment of the plurality of segments, wherein the predicted recovery value is within the range of recovery values corresponding to the first segment;
      transmit, to the client system, an electronic message comprising the first segment;
      receive, from the client system a first actual recovery value for the first individual;
      update the plurality of actual recovery values to include the first actual recovery value; and
      provide the updated plurality of actual recovery values to the training engine for additional training, retraining, or updating of the hyperdimensional model.

2. The system of claim 1, wherein the predicted unit yield comprises a total monetary amount predicted to be received from the first individual, and wherein the predicted recovery rate comprises a percentage of a total amount owed expected to be received from the first individual.

3. The system of claim 1, wherein the first actual recovery value comprises an actual unit yield and an actual recovery rate, wherein the actual unit yield comprises a total monetary amount received from the first individual, and wherein the actual recovery rate comprises a percentage of a total amount owed that was received from the first individual.

4. The system of claim 1, wherein the input data comprises one or more of: accounts receivable data, payment history data, or credit related data.

5. The system of claim 1, wherein the client system is a first client system of a plurality of client systems, and wherein execution of the instructions further causes the one or more processors to:
   aggregate one or more actual recovery values associated with each of the plurality of client systems;
   generate a first plurality of partitions by sorting the aggregated actual recovery values based on the plurality of segment boundary definitions, wherein a first partition of the first plurality of partitions comprises a subset of the aggregated actual recovery values;
   generate a first average recovery value comprising an average of the subset of the aggregated actual recovery values associated with the first partition;
   generate a second plurality of partitions by sorting the plurality of actual recovery values based on the plurality of segment boundary definitions, wherein a second partition of the second plurality of partitions comprises a subset of the plurality of actual recovery values;
   generate a second average recovery value comprising an average of the subset of the plurality of actual recovery values associated with the second partition;
   generate comparison results by comparing the first average recovery value against the second average recovery value; and
   transmit, to the first client system, a networked message comprising the comparison results.

6. The system of claim 5, wherein execution of the instructions further causes the one or more processors to:
   receive, from the plurality of client systems, geographic information associated with each of the plurality of client systems; and
   aggregate the one or more actual recovery values associated with each of the plurality of client systems based on the geographic information.

7. The system of claim 5, wherein execution of the instructions further causes the one or more processors to:
   receive, from the plurality of client systems, demographic information associated with each of the plurality of client systems; and
   aggregate the one or more actual recovery values associated with each of the plurality of client systems based on the demographic information.

8. The system of claim 1, wherein each individual of the second plurality of individuals is represented as a data point corresponding to a value for each variable in the first training data.

9. The system of claim 1, wherein spline interpolation is performed within each dimension of the hyperdimensional model.

10. The system of claim 1, wherein execution of the instructions further causes the one or more processors to:
   perform regression analysis on the hyperdimensional model to determine a relationship between the input data and the predicted recovery value; and
   generate a formula based on the determined relationship.

11. A method for automatic data segmentation, comprising:
   receiving, from a client system, input data associated with a first individual of a first plurality of individuals for whom a client system has provided a service;

inputting, into a hyperdimensional model, the input data, wherein the hyperdimensional model has been training by a training engine to generate predicted recovery values by:
  collecting historical data from the client system, wherein the historical data comprises historical input data and a plurality of actual recovery values, the historical input data and the plurality of actual recovery values corresponding to a second plurality of individuals for whom the client system has previously provided a service,
  generating first training data based on the historical data, wherein the hyperdimensional model comprises a plurality of dimensions, and wherein each dimension in the plurality of dimensions corresponds to a variable of the first training data, and
  training the hyperdimensional model using the first training data;
receiving, from the hyperdimensional model, a predicted recovery value for the first individual, wherein the predicted recovery value is a weighted average of a predicted unit yield and a predicted recovery rate for the first individual;
receiving, from the client system, a plurality of segment boundary definitions that define a plurality of segments, where each of the plurality of segments correspond to a range of recovery values;
based on the predicted recovery value, assigning the first individual to a first segment of the plurality of segments, wherein the predicted recovery value is within the range of recovery values corresponding to the first segment;
transmitting, to the client system, an electronic message comprising the first segment;
receiving, from the client system, a first actual recovery value for the first individual;
updating the plurality of actual recovery values to include the first actual recovery value; and
providing the updated plurality of actual recovery values to the training engine for additional training, retraining, or updating of the hyperdimensional model.

12. The method of claim 11, wherein the predicted unit yield comprises a total monetary amount predicted to be received from the first individual, and wherein the predicted recovery rate comprises a percentage of a total amount owed expected to be received from the first individual.

13. The method of claim 11, wherein the first actual recovery value comprises an actual unit yield and an actual recovery rate, wherein the actual unit yield comprises a total monetary amount received from the first individual, and wherein the actual recovery rate comprises a percentage of a total amount owed that was received from the first individual.

14. The method of claim 11, wherein the input data comprises one or more of: accounts receivable data, payment history data, or credit related data.

15. The method of claim 11, wherein the client system is a first client system of a plurality of client systems, and wherein the method further comprises:
  aggregating one or more actual recovery values associated with each of the plurality of client systems;
  generating a first plurality of partitions by sorting the aggregated actual recovery values based on the plurality of segment boundary definitions, wherein a first partition of the first plurality of partitions comprises a subset of the aggregated actual recovery values;
  generating a first average recovery value comprising an average of the subset of the aggregated actual recovery values associated with the first partition;
  generating a second plurality of partitions by sorting the plurality of actual recovery values based on the plurality of segment boundary definitions, wherein a second partition of the second plurality of partitions comprises a subset of the plurality of actual recovery values;
  generating a second average recovery value comprising an average of the subset of the plurality of actual recovery values associated with the second partition;
  generating comparison results by comparing the first average recovery value against the second average recovery value; and
  transmitting, to the first client system, an electronic message comprising the first segment.

16. One or more non-transitory computer-readable media comprising computer-executable instructions, that, when executed, cause a system to:
  receive, from a client system, input data associated with a first individual of a first plurality of individuals for whom a client system has provided a service;
  input, into a hyperdimensional model, the input data, wherein the hyperdimensional model has been trained by a training engine to generate predicted recovery values by:
    collecting historical data from the client system, wherein the historical data comprises historical input data and a plurality of actual recovery values, the historical input data and the plurality of actual recovery values corresponding to a second plurality of individuals for whom the client system has previously provided a service,
    generating first training data based on the historical data, wherein the hyperdimensional model comprises a plurality of dimensions, and wherein each dimension in the plurality of dimensions corresponds to a variable of the first training data, and
    training the hyperdimensional model using the first training data;
  receive, from the hyperdimensional model, a predicted recovery value for the first individual, wherein the predicted recovery value is a weighted average of a predicted unit yield and a predicted recovery rate for the first individual;
  receive, from the client system, a plurality of segment boundary definitions that define a plurality of segments, where each of the plurality of segments correspond to a range of recovery values;
  based on the predicted recovery value, assign the first individual to a first segment of the plurality of segments, wherein the predicted recovery value is within the range of recovery values corresponding to the first segment;
  transmit, to the client system, an electronic message comprising the first segment;
  receive, from the client system a first actual recovery value for the first individual;
  update the plurality of actual recovery values to include the first actual recovery value; and
  provide the updated plurality of actual recovery values to the training engine for additional training, retraining, or updating of the hyperdimensional model.

17. The non-transitory computer-readable media of claim 16, wherein the predicted unit yield comprises a total monetary amount predicted to be received from the first individual, and wherein the predicted recovery rate comprises a percentage of a total amount owed expected to be received from the first individual.

18. The non-transitory computer-readable media of claim 16, wherein the first actual recovery value comprises an actual unit yield and an actual recovery rate, wherein the actual unit yield comprises a total monetary amount received from the first individual, and wherein the actual recovery rate comprises a percentage of a total amount owed that was received from the first individual.

19. The non-transitory computer-readable media of claim 16, wherein the input data comprises one or more of: accounts receivable data, payment history data, or credit related data.

20. The non-transitory computer-readable media of claim 16, wherein the client system is a first client system of a plurality of client systems, and wherein execution of the instructions further causes the system to:

aggregate one or more actual recovery values associated with each of the plurality of client systems;

generate a first plurality of partitions by sorting the aggregated actual recovery values based on the plurality of segment boundary definitions, wherein a first partition of the first plurality of partitions comprises a subset of the aggregated actual recovery values;

generate a first average recovery value comprising an average of the subset of the aggregated actual recovery values associated with the first partition;

generate a second plurality of partitions by sorting the plurality of actual recovery values based on the plurality of segment boundary definitions, wherein a second partition of the second plurality of partitions comprises a subset of the plurality of actual recovery values;

generate a second average recovery value comprising an average of the subset of the plurality of actual recovery values associated with the second partition;

generate comparison results by comparing the first average recovery value against the second average recovery value; and transmit, to the first client system, a networked message comprising the comparison results.

\* \* \* \* \*